(12) United States Patent
Kisa et al.

(10) Patent No.: US 12,015,546 B2
(45) Date of Patent: Jun. 18, 2024

(54) ROUTING DESTINATION EVALUATION APPARATUS, ROUTING DESTINATION EVALUATING METHOD AND PROGRAM

(71) Applicant: NTT Communications Corporation, Tokyo (JP)

(72) Inventors: Yoshiko Kisa, Tokoyo (JP); Takayuki Kamei, Funabashi (JP)

(73) Assignee: NTT Communications Corporation, Tokyo (JP)

( * ) Notice: Subject to any disclaimer, the term of this patent is extended or adjusted under 35 U.S.C. 154(b) by 0 days.

(21) Appl. No.: 17/555,184

(22) Filed: Dec. 17, 2021

(65) Prior Publication Data

US 2022/0116316 A1 Apr. 14, 2022

Related U.S. Application Data

(63) Continuation of application No. PCT/JP2020/024017, filed on Jun. 18, 2020.

(30) Foreign Application Priority Data

Jun. 21, 2019 (JP) .................................. 2019-115693

(51) Int. Cl.
*H04L 45/302* (2022.01)
*H04L 45/00* (2022.01)
*H04L 47/2416* (2022.01)

(52) U.S. Cl.
CPC ............ *H04L 45/308* (2013.01); *H04L 45/70* (2013.01); *H04L 47/2416* (2013.01)

(58) Field of Classification Search
None
See application file for complete search history.

(56) References Cited

U.S. PATENT DOCUMENTS 10,055,262 B1 * 8/2018 Thomas ................ G06F 9/5083
10,261,834 B2 * 4/2019 Mecklin ................ G06F 9/5044
(Continued)

FOREIGN PATENT DOCUMENTS

CN 101610174 A 12/2009
EP 1529406 B1 5/2012
(Continued)

OTHER PUBLICATIONS

Laquerre, Peter et al. Oracle Cloud Infrastructure Load Balancing Classic; Nov. 2018, [retrieval date Aug. 14, 2020], Internet: https://docs.oracle.com/cd/E83857_01/iaas/load-balancer-cloud/1brug/Index.html, in particular section, section "Creating a load balancer policy", non-official translation ("Using Oracle Cloud Infrastructure Load Balancing Classic E76938-08 [online]").
(Continued)

*Primary Examiner* — Nicholas Sloms
(74) *Attorney, Agent, or Firm* — Knobbe, Martens, Olson & Bear, LLP

(57) ABSTRACT

According to one embodiment, a routing destination evaluation apparatus includes a metrics acquisition unit and a routing destination evaluation unit. The metrics acquisition unit acquires time-series data of types of metrics associated with a candidate. The candidate is one of candidates of a routing destination to which the routing control apparatus routes a request including the first destination data. The routing destination evaluation unit evaluates the candidates based on the time-series data, and generates routing destination evaluation data.

13 Claims, 13 Drawing Sheets

(56) References Cited

U.S. PATENT DOCUMENTS

| | | | |
|---|---|---|---|
| 2003/0065762 A1 | 4/2003 | Stolorz et al. | |
| 2004/0022224 A1 | 2/2004 | Billhartz | |
| 2006/0294219 A1 | 12/2006 | Ogawa et al. | |
| 2007/0263650 A1* | 11/2007 | Subramania | H04L 47/10 370/468 |
| 2009/0150565 A1 | 6/2009 | Grossner et al. | |
| 2011/0264798 A1 | 10/2011 | Joshi | |
| 2011/0289214 A1* | 11/2011 | Freedman | H04L 47/6215 709/224 |
| 2015/0281339 A1 | 10/2015 | Strassner | |
| 2015/0312325 A1* | 10/2015 | Lowekamp | H04L 67/10 709/203 |
| 2016/0337426 A1* | 11/2016 | Shribman | H04L 65/612 |
| 2017/0126789 A1 | 5/2017 | Kondapalli et al. | |
| 2018/0191622 A1 | 7/2018 | Karthikeyan et al. | |
| 2018/0278498 A1 | 9/2018 | Zeng et al. | |
| 2019/0104069 A1 | 4/2019 | Kommula et al. | |
| 2020/0014486 A1* | 1/2020 | Harrang | H04L 69/163 |
| 2020/0177502 A1 | 6/2020 | Lucas et al. | |
| 2020/0195673 A1* | 6/2020 | Lee | H04L 45/70 |
| 2020/0314208 A1* | 10/2020 | Meenan | H04L 67/56 |
| 2022/0109609 A1 | 4/2022 | Ono et al. | |
| 2022/0116324 A1 | 4/2022 | Kamei | |
| 2022/0116328 A1 | 4/2022 | Tamura et al. | |

FOREIGN PATENT DOCUMENTS

| | | |
|---|---|---|
| GB | 2539994 A | 1/2017 |
| JP | 2005-537687 A | 12/2005 |
| JP | 2009-181152 A | 8/2009 |
| JP | 2011-170422 A | 9/2011 |
| JP | 2012-159873 A | 8/2012 |
| JP | 2015-231134 A | 12/2015 |
| WO | WO 2005/034446 A1 | 4/2005 |
| WO | WO 2009/072094 A2 | 6/2009 |
| WO | WO 2017/037768 A1 | 3/2017 |
| WO | WO 2017/119950 A1 | 7/2017 |
| WO | WO 2020/256074 A1 | 12/2020 |
| WO | WO 2020/256075 A1 | 12/2020 |
| WO | WO 2020/256076 A1 | 12/2020 |
| WO | WO 2020/256077 A1 | 12/2020 |

OTHER PUBLICATIONS

PCT International Search Report of PCT Application No. PCT/JP2020/024017 dated Aug. 25, 2020, 6 pages.

Yasukawa, Seisho et al., "Research toward Realizing a Future Network Architecture", NTT Gijutu Journal (NTT Technical Review), Mar. 2018, pp. 23-30.

U.S. Appl. No. 17/555,209, filed Dec. 17, 2021, Policy Determination Apparatus, Policy Determining Method and Program.

U.S. Appl. No. 17/555,271, filed Dec. 17, 2021, Policy Determination Apparatus, Policy Determining Method and Program.

U.S. Appl. No. 17/555,232, filed Dec. 17, 2021, Policy Determination Apparatus, Policy Determining Method and Program.

PCT International Search Report and Written Opinion for International Application No. PCT/JP2020/024016 dated Aug. 25, 2020, 16 pages.

PCT International Preliminary Report on Patentability for International Application No. PCT/JP2020/024016 dated Dec. 30, 2021, 13 pages.

PCT International Search Report and Written Opinion for International Application No. PCT/JP2020/024017 dated Aug. 25, 2020, 14 pages.

PCT International Preliminary Report on Patentability for International Application No. PCT/JP2020/024017 dated Dec. 30, 2021, 11 pages.

PCT International Search Report and Written Opinion for International Application No. PCT/JP2020/024018, dated Sep. 1, 2020, 11 pages.

PCT International Preliminary Report on Patentability for International Application No. PCT/JP2020/024018, dated Dec. 30, 2021, 9 pages.

PCT International Search Report and Written Opinion for International Application No. PCT/JP2020/024015, dated Aug. 25, 2020, in 14 pages.

PCT International Preliminary Report on Patentability for International Application No. PCT/JP2020/024015, dated Dec. 30, 2021, in 11 pages.

Extended Search Report for EP Application No. 20827422.5 dated Jul. 8, 2022, 10 pages.

Extended Search Report for EP Application No. 20827498.5 dated Jul. 8, 2022, 12 pages.

Extended Search Report for EP Application No. 20826374.9 dated Jun. 21, 2022, 11 pages.

Japanese Office Action for JP Application No. 2019-115693 dated Jun. 6, 2023, 7 pages.

Extended Search Report for EP Application No. 20825665.1 dated May 9, 2023, 9 pages.

Chinese Office Action for CN Application No. CN 202080045536.9 dated Nov. 23, 2023, 18 pages.

* cited by examiner

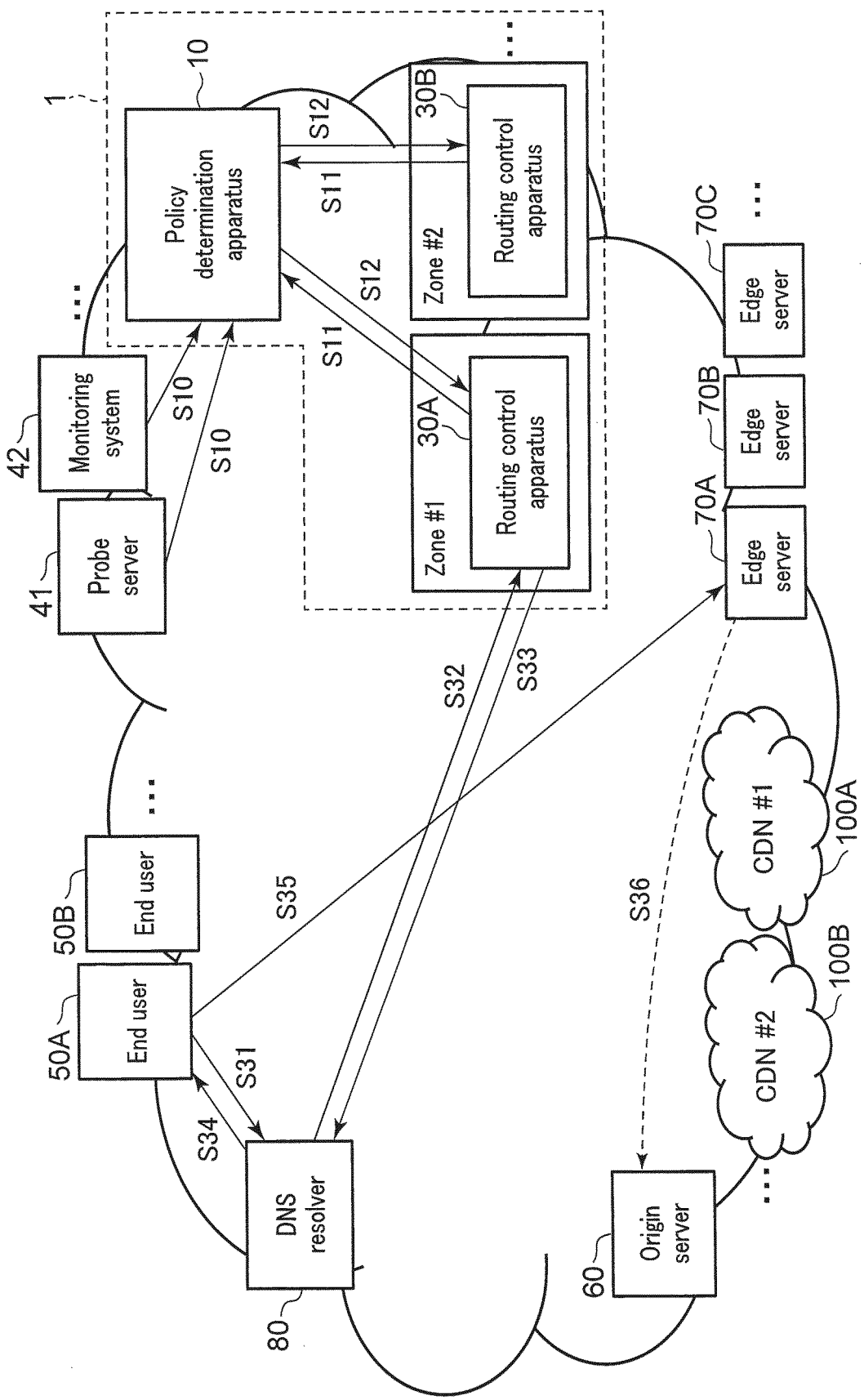
F I G. 1A

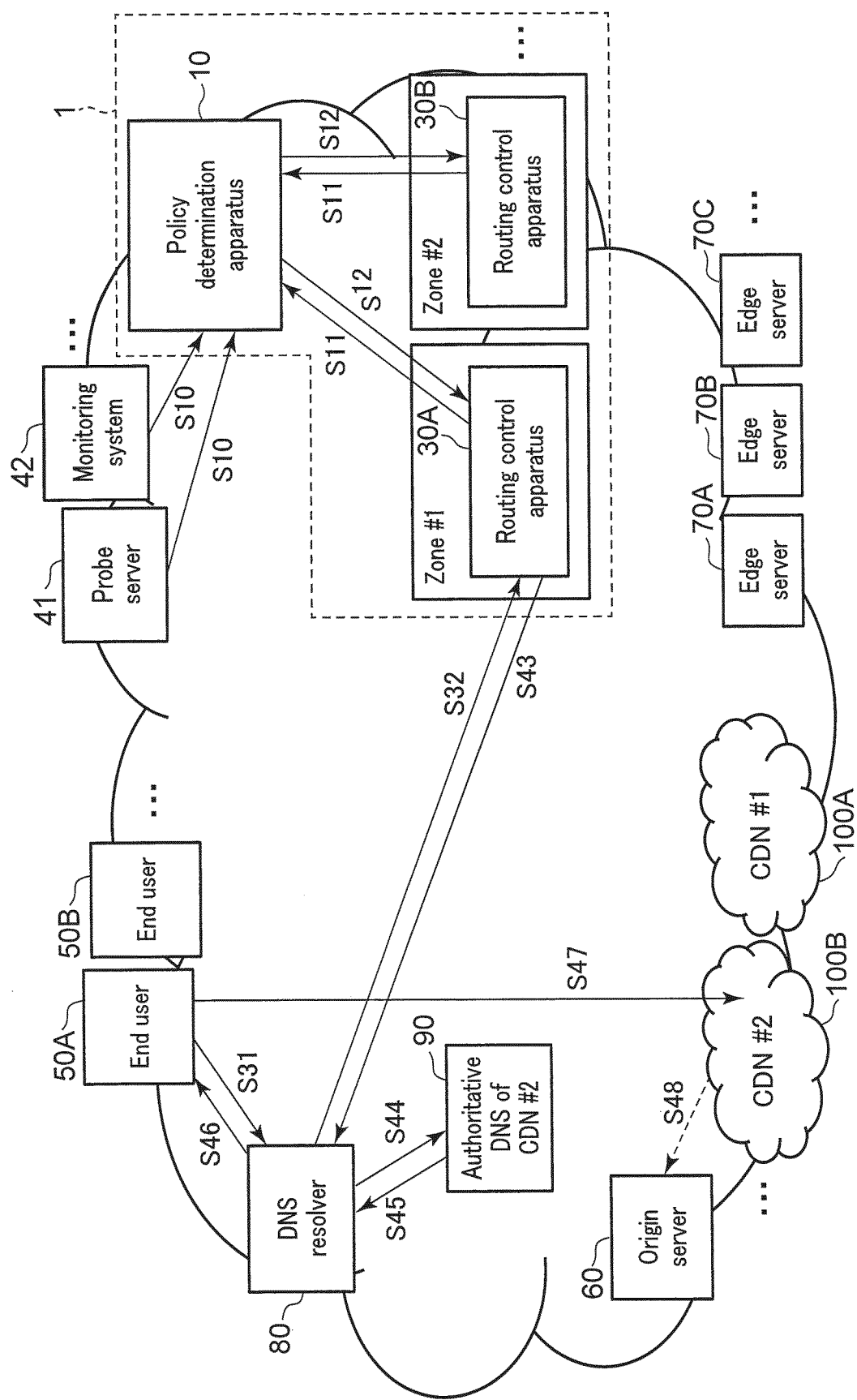
F I G. 1B

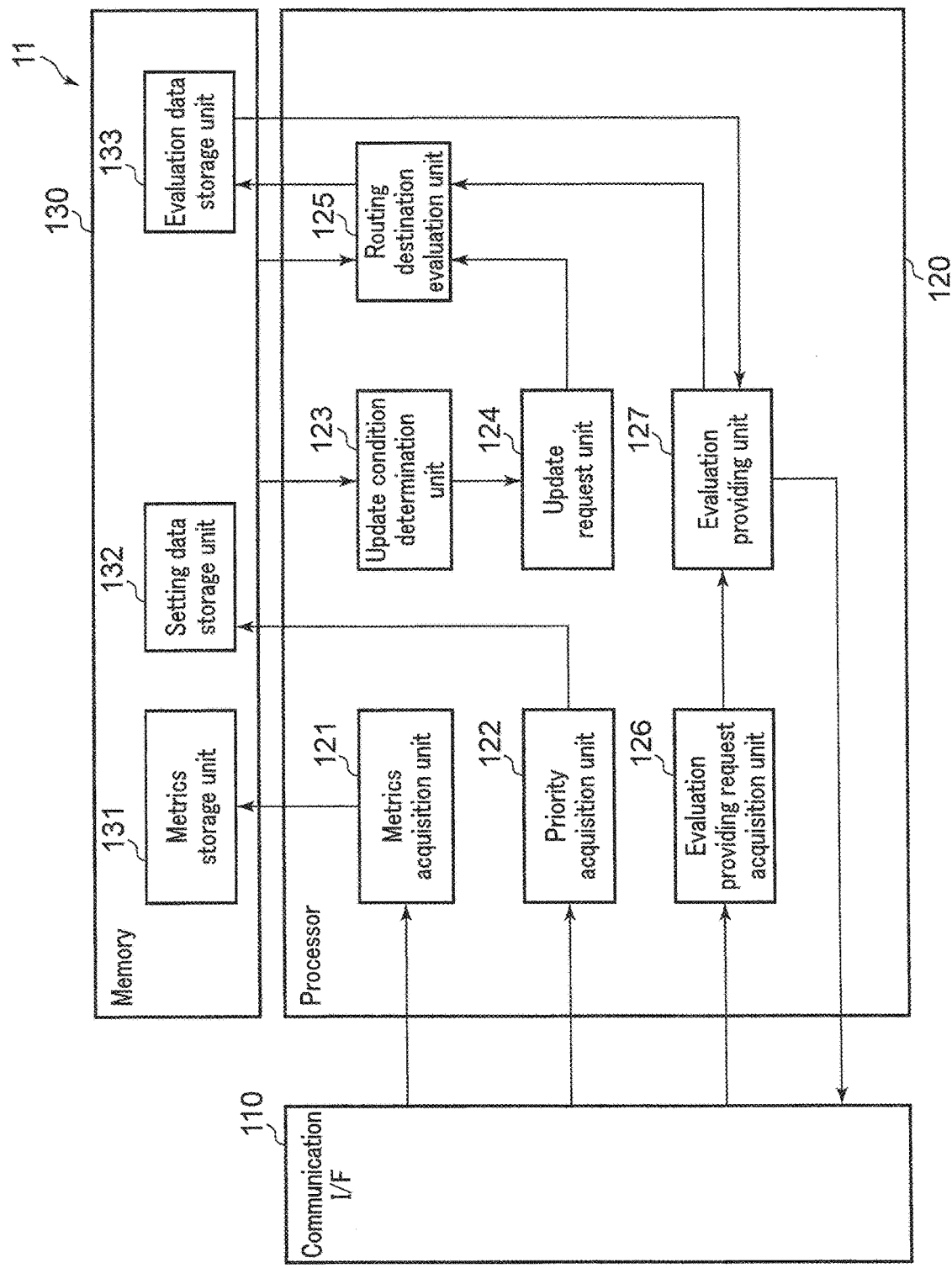
F I G. 3

|  | Availability | RTT | Cost |
|---|---|---|---|
| Edge 1 | ○ | 100 | ¥500 |
| Edge 2 | × | — | ¥500 |
| Edge 3 | ○ | 200 | ¥300 |
| Edge 4 | × | — | ¥200 |
| Edge 5 | ○ | 240 | ¥400 |
| Edge 6 | ○ | 160 | ¥500 |
| Edge 7 | ○ | 160 | ¥300 |
| ⋮ | ⋮ | ⋮ | ⋮ |

FIG. 6

|  | RTT | RTT score | Cost | Cost score |
|---|---|---|---|---|
| Edge 1 | 100 | 0———0.8–1 | ¥500 | 0———0.4———1 |
| Edge 2 | — | 0.0————1 | ¥500 | 0———0.4———1 |
| Edge 3 | 200 | 0———0.5———1 | ¥300 | 0———0.6———1 |
| Edge 4 | — | 0.0————1 | ¥200 | 0———0.7———1 |
| Edge 5 | 240 | 0———0.4———1 | ¥400 | 0———0.5———1 |
| Edge 6 | 160 | 0———0.6———1 | ¥500 | 0———0.4———1 |
| Edge 7 | 160 | 0———0.6———1 | ¥300 | 0———0.6———1 |
| ⋮ | ⋮ | ⋮ | ⋮ | ⋮ |

FIG. 7

|  |  | Standard | Arbitrary |
|---|---|---|---|
| Priority | RTT | 80 | 30 |
|  | Cost | 20 | 70 |
| Number k of edges |  | 2 | 1 |

FIG. 8

|  |  | Edge score |
|---|---|---|
| Edge 1 | 80 × 0.8 + 20 × 0.4 | 72 |
| Edge 2 | 80 × 0.0 + 20 × 0.4 | 8 |
| Edge 3 | 80 × 0.5 + 20 × 0.6 | 52 |
| Edge 4 | 80 × 0.0 + 20 × 0.7 | 14 |
| Edge 5 | 80 × 0.4 + 20 × 0.5 | 42 |
| Edge 6 | 80 × 0.6 + 20 × 0.4 | 56 |
| Edge 7 | 80 × 0.6 + 20 × 0.6 | 60 |
| ⋮ | ⋮ | ⋮ |

F I G. 9

| Edge ranking | Edge score |  | Weight |
|---|---|---|---|
| Edge 1 | 72 | 72/(72+60) | 55% |
| Edge 7 | 60 | 60/(72+60) | 45% |

F I G. 10

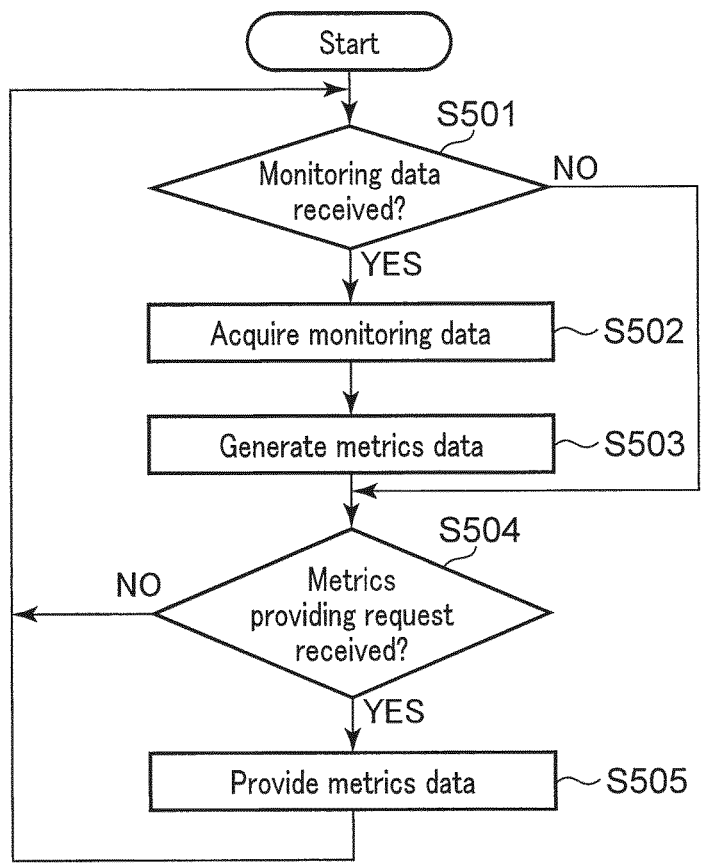
F I G. 12

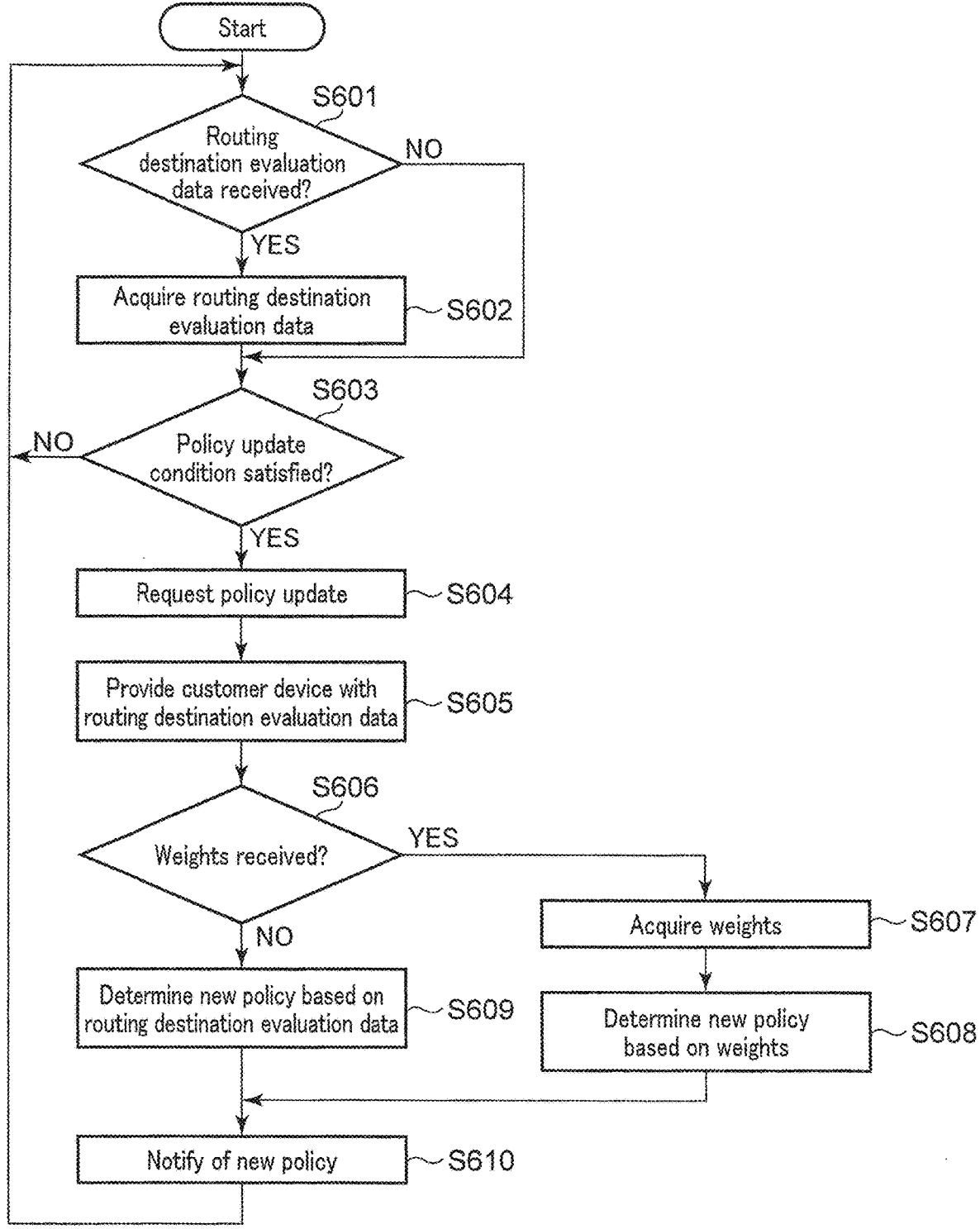
F I G. 13

ROUTING DESTINATION EVALUATION APPARATUS, ROUTING DESTINATION EVALUATING METHOD AND PROGRAM

CROSS-REFERENCE TO RELATED APPLICATIONS

This application is a Continuation Application of PCT Application No. PCT/JP2020/024017, filed Jun. 18, 2020 and based upon and claiming the benefit of priority from prior Japanese Patent Application No. 2019-115693, filed Jun. 21, 2019, the entire contents of all of which are incorporated herein by reference.

FIELD

One aspect of the present embodiment relates to load distribution on a network.

BACKGROUND

In accordance with the recent development of Internet of Things (IoT) and mobile communication technologies, the volume of data transmitted through the Internet and other networks has been exponentially increasing. For this reason, further development of techniques for network load distribution and traffic control is being sought after.

In a network system, by not routing Hypertext Transfer Protocol (HTTP) requests to a single server such as the origin server of content delivery network (CDN), but rather distributing them to this server and other substitute servers, expandability and availability of the system can be enhanced. The load distribution technique can be roughly categorized into a static division scheme and a dynamic division scheme: with the former scheme, a request is routed to different servers in accordance with a predetermined policy such as round robin and weighted round robin, whereas with the latter scheme, a request is routed to the optimal server by monitoring in real time the states of the servers, such as the number of connections, the number of clients, the volume of data communication, response time, loads on the servers, and the like.

In recent years, the load distribution technique has been applied to the edge computing technique, CDN technique, and the like. Non-patent literature 1 indicates that the CDN technique is now under consideration in order to realize high-quality distributions in an economical manner for next-generation high-definition high-presence video content, as typified by 4K/8K and AR/VR.

CITATION LIST

Non Patent Literature

[NON PATENT LITERATURE 1] Seisho Yasukawa et al., "Research toward Realizing a Future Network Architecture", NTT Technical Review, March 2018, pages 23 to 30

SUMMARY

Technical Problem

With the aforementioned static distribution scheme, the load distribution can be realized with a simply policy, but if a change occurs in the states of routing destination candidates, the efficiency may be lowered. In contrast, with the aforementioned dynamic distribution scheme, the load distributing efficiency is not easily lowered even if there is a change in the state of the routing destination candidates. However, a load balancer is required in order to monitor the states of the routing destination candidates in real time and select a routing destination.

The purpose of the present embodiments is to dynamically evaluate candidates of a request routing destination.

Solution to Problem

The routing destination evaluation apparatus according to the first aspect of the present embodiment includes a metrics acquisition unit and a routing destination evaluation unit. The metrics acquisition unit is configured to acquire time-series data of a plurality of types of metrics associated with a candidate, the candidate being one of candidates of a routing destination to which the routing control apparatus routes a request including the first destination data. The routing destination evaluation unit is configured to evaluate the candidates based on the time-series data of the types of metrics associated with the candidate and generate routing destination evaluation data. In this manner, the request routing destination candidates can be dynamically evaluated.

In the routing destination evaluation apparatus according to the first aspect, the routing destination evaluation unit may evaluate the candidates based on the time-series data of types of metrics associated with the candidate and the priorities assigned to the metrics of these types. In this routing destination evaluation apparatus (hereinafter referred to as a "routing destination evaluation apparatus according to the second aspect of the present embodiment"), a plurality of candidates can be evaluated by taking into consideration the priorities assigned to the metrics, in addition to the values of the metrics themselves.

The routing destination evaluation apparatus according to the second aspect may further include a priority acquisition unit configured to acquire priorities received from a customer device authorized to set the priorities. The routing destination evaluation unit may evaluate the candidates based on time-series data of the types of metrics associated with the candidate and the priorities received from the customer device and generate the routing destination evaluation data. This routing destination evaluation apparatus (hereinafter referred to as a "routing destination evaluation apparatus according to the third aspect of the present embodiment") allows the user (customer) of the customer device to set priorities that suit his/her own preference so that the influence of the values of the metrics on evaluation can be freely adjusted.

In the routing destination evaluation apparatus according to the second or third aspect, the routing destination evaluation unit may calculate the evaluation values of the candidates by obtaining a weighted addition of values based on the time-series data of the types of metrics corresponding to the candidate in accordance with the priorities, and rank at least a portion of the candidates in descending order of their evaluation values to generate the routing destination evaluation data. This routing destination evaluation apparatus (hereinafter referred to as a "routing destination evaluation apparatus according to the fourth aspect of the present embodiment") can adjust the influence of each value of the metrics on the evaluation by way of priorities assigned to the metrics, and can also generate routing destination evaluation data in a ranking format, with which candidates with high evaluation values are easily ascertainable.

In the routing destination evaluation apparatus according to the fourth aspect, values based on the time-series data of the types of metrics may be normalized so as to fit in a certain numerical range. This routing destination evaluation apparatus (hereinafter referred to as a "routing destination evaluation apparatus according to the fifth aspect of the present embodiment") can equitably deal with metrics having different variance ranges to evaluate the routing destination candidates.

In the routing destination evaluation apparatus according to the first to fifth aspects, the types of metrics associated with a first candidate of the candidates may include first metrics relating to request a transmission cost when the first candidate is selected as the routing destination, and second metrics relating to request transmission quality when the first candidate is selected as the routing destination. This routing destination evaluation apparatus (hereinafter referred to as a "routing destination evaluation apparatus according to the sixth aspect of the present embodiment") can evaluate the routing destination candidates from multiple points of view including the transmission cost and the transmission quality.

The routing destination evaluation apparatus according to the first to sixth aspects may further include an evaluation providing unit configured to provide an external device with routing destination evaluation data. This routing destination evaluation apparatus (hereinafter referred to as a "routing destination evaluation apparatus according to the seventh aspect of the present embodiment") can provide an external device with routing destination evaluation data.

The routing destination evaluation apparatus according to the first to seventh aspects may further include an update condition determination unit configured to determine whether a preset evaluation update condition is satisfied, and an update request unit configured to request an update of the routing destination evaluation data when it is determined that the evaluation update condition is satisfied. In this manner, the routing destination evaluation data can be updated every time the evaluation update condition is satisfied.

The routing destination evaluating method according to the eighth aspect of the present embodiment includes acquiring time-series data of the types of metrics associated with a candidate, the candidate being one of candidates of a routing destination to which the routing control apparatus routes a request including first destination data, evaluating the candidates based on the time-series data of the types of metrics associated with the candidate, and generating routing destination evaluation data. In this manner, the request routing destination candidates can be dynamically evaluated.

The routing destination evaluating program according to the ninth aspect of the present embodiment causes a computer to function as a means for acquiring time-series data of types of metrics associated with a candidate, the candidate being one of candidates of a routing destination to which a routing control apparatus routes a request including first destination data, and a means for evaluating the candidates based on the time-series data of the types of metrics associated with the candidate and generating routing destination evaluation data. In this manner, the request routing destination candidates can be dynamically evaluated.

Advantageous Effects of Invention

According to the present embodiment, the request routing destination candidates can be dynamically evaluated.

BRIEF DESCRIPTION OF THE DRAWINGS

FIG. 1A is a diagram showing an exemplary load distribution system including a routing destination evaluation apparatus according to the present embodiment.

FIG. 1B is a diagram showing another exemplary load distribution system including a routing destination evaluation apparatus according to the present embodiment.

FIG. 3 is a block diagram showing an exemplary routing destination evaluation apparatus according to the present embodiment.

FIG. 6 is a diagram showing exemplary storage content in a monitoring data storage unit illustrated in FIG. 4.

FIG. 7 is a diagram showing exemplary storage content in a metrics storage unit illustrated in FIG. 3.

FIG. 8 is a diagram showing exemplary storage content in a setting data storage unit illustrated in FIG. 3.

FIG. 9 is a diagram explaining the operation of a routing destination evaluation unit illustrated in FIG. 3.

FIG. 10 is a diagram explaining the operation of a policy determination unit illustrated in FIG. 5.

FIG. 12 is a flowchart showing an exemplary operation performed by the metrics generation apparatus in FIG. 4.

FIG. 13 is a flowchart showing an exemplary operation performed by the policy control apparatus in FIG. 5.

DETAILED DESCRIPTION

Figure 1C:
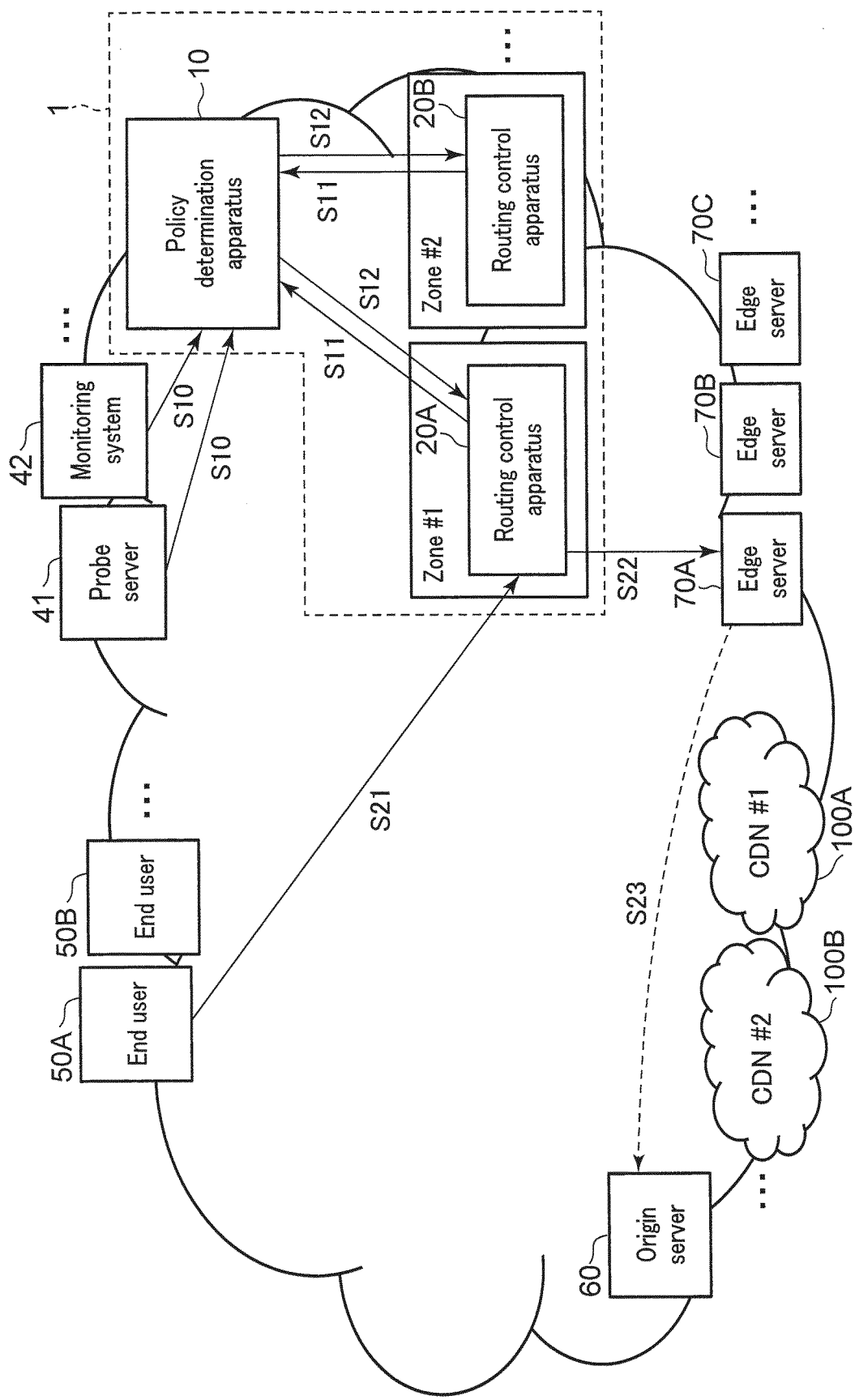
FIG. 1C is a diagram showing another exemplary load distribution system including a routing destination evaluation apparatus according to the present embodiment.

Embodiments of the present embodiment will be described below with reference to the drawings. Components that are the same as or similar to already explained components are provided with the same or similar reference signs, and overlapping explanations will essentially be omitted.

In order to facilitate the understanding of the policy determination apparatus that uses the routing destination evaluation data generated by the routing destination evaluation apparatus according to the present embodiment, working examples of the policy determination apparatus will first be explained.

Working Examples (1) Configuration

FIG. 1A is a diagram showing the first example of the overall configuration of a load distribution system including a policy determination apparatus 10 that uses routing destination evaluation data generated by a routing destination evaluation apparatus 11 according to the embodiment of the present embodiment and the processing flow of this system.

A routing control system 1 including the policy determination apparatus 10 according to the present embodiment is provided, for example on a web or cloud, and is connected in a communicable manner through a data transmission network to a probe servers 41, a monitoring system 42, end users 50A, 50B . . . (hereinafter also collectively referred to as "end users 50"), edge servers 70A, 70B, 70C . . . (hereinafter also collectively referred to as "edge servers 70"), CDNs 100A, 100B . . . (hereinafter also collectively referred to as "CDNs 100"), and an origin server 60.

The data transmission network includes, for example, a relay network, and a plurality of access networks for accessing this relay network. As a relay network, a commonly employed public network such as the Internet, or a closed network that is controlled in a manner such that only limited devices can have access, may be adopted. As an access network, a wireless local area network (wireless LAN), cell phone network, wired telephone network, Fiber To The Home (FTTH) network, cable television (CATV) network, and the like may be adopted. In the following description, the Internet will be discussed as a data transmission network for the sake of simplicity.

The probe server 41 and/or monitoring system 42 may be a server computer or a personal computer. The probe server 41 and/or monitoring system 42 continuously collect and monitor the states of network facilities such as the origin server 60, edge servers 70, and/or CDNs 100, including log information such as an operation log and security log, and load information such as usage of servers and memories. The probe server 41 and/or monitoring system 42 generate the monitoring data and transmit the data to the policy determination apparatus 10. Any number of probe servers 41 and/or monitoring systems 42 can be connected to the policy determination apparatus 10 through a network.

An end user 50 is an IoT device capable of collecting measurement results, for example, from information processing terminals of the users such as personal computers and smart phones, vehicles that can establish a connection to the network to transmit and receive information, or various kinds of sensors, and transmitting the results. Access requests from end users 50 therefore includes those for downloading data such as video and other content or software updating programs, and for uploading data such as IoT data. Any number of end users 50 can be connected to a routing control apparatus 30 in the routing control system 1 through a network.

An edge server 70 is constituted by any number of server computers capable of caching data. The CDN 100A, which serves as an edge network, may be operated by a first CDN business operator.

The CDN 100B and the like may be operated by CDN business operators different from the first CDN business operator. The CDNs 100 are not illustrated as revealing the information of the edge servers therein to the routing control system 1. Some of the CDNs 100, however, may be configured to reveal the information of the edge servers therein to the routing control system 1. In this case, the routing control system 1 may handle the CDN 100 as a routing destination candidate, or the edge server in the CDN 100 as a routing destination candidate.

In the following description, the CDN 100A, CDN 100B . . . , and the like, and edge servers 70 accessible from the routing control system 1, may be simply referred to as "edges", which serve as routing destination candidates, or may be collectively referred to as a group of edges. A group of edges may also include not-shown cloud computing services provided by service providers, and CDNs and the like that partially reveal the interior information. Any number of edges can be connected to the end users 50 through the network.

The origin server 60 is a data server operated and managed by a content distributor such as a web server and a file server, holding content that are to be distributed to the end users 50 (allowing the end users 50 to download the data), or the origin server 60 is a data server operated and managed by a business operator who collects the IoT data, collecting data from the end users 50 (allowing the end users 50 to upload the data). The drawing shows only one origin server 60, but any number of origin servers 60 can be included.

With regard to access requests from the end users 50, the routing control system 1 selects a suitable routing destination from the group of edges including the CDNs 100 or edge servers 70, and routes the requests. In particular, the policy determination apparatus 10 in the routing control system 1 determines a policy to be used for controlling the routing destination to which the request is routed, and the routing control apparatus 30 in the routing control system 1 routes the request in accordance with this policy. The policy here may indicate a plurality of request routing destination candidates and proportions of the candidates to which the request is routed. The routing control apparatus 30 may use these proportions as weights for the weighted round robin when assigning the request.

The routing control system 1 includes the policy determination apparatus 10, and the routing control apparatuses 30A, 30B . . . (hereinafter collectively referred to as the "routing control apparatuses 30"). The routing control system 1 may include any number of routing control apparatuses 30.

The policy determination apparatus 10 may be a server computer or a personal computer, and is configured to collect monitoring data from the probe server 41 and/or monitoring system 42 and determine (generate or update) a policy based on items of metrics derived or calculated from the monitoring data.

The metrics here denotes an indicator used for evaluation of selectable candidates as a request routing destination, the indicator indicating the state of each candidate. The metrics may be a value as-is contained in the monitoring data, or a manipulated value or statistical value of the contained value.

The policy determination apparatus 10 may be further configured to determine a policy based on a request from a customer, who is a service provider using the origin server 60. For instance, the policy determination apparatus 10 may evaluate the candidates by considering the metrics of each routing destination candidate with reference to the criteria corresponding to the priorities designated by a customer device, and thereby determine the policy. Alternatively, the policy determination apparatus 10 may determine the policy in such a manner that the request are routed to the candidates at a ratio based on the weights set by the customer device.

The customer device here indicates a device authorized to set weights for determining a policy to be applied to the request including destination data and made to the origin server 60, and/or priorities to be assigned to the metrics relating to the evaluation for determining this policy. For instance, in accordance with an operation performed by the operator of the origin server 60, terminals connected to the intra-office network or to a public network make access to the web site (portal site) for establishing the setting. These terminals are authorized by passing authentication such as password authentication, and serve as customer devices during the authorization period. The customer devices are allowed to browse evaluation data (e.g., ranking data) of the routing destination candidates and to set the weights and/or priorities.

As described above, the policy determination apparatus 10 serves as a brain of the routing control system 1, presenting a policy that indicates how a routing destination should be selected.

On the other hand, the routing control apparatuses 30 implement a routing control process to actualize the routing control system 1, in accordance with the policy determined by the policy determination apparatus 10, which serves as the brain. The routing control apparatus 30 may correspond to an L4 load balancer (also referred to as a DNS load balancer). The routing control apparatus 30A, 30B . . . are assigned to the first zone #1, second zone #2 . . . . A zone is defined for each routing control apparatus 30 so that the routing control apparatus 30 can route a request to the Point of Presence (PoP) of the corresponding zone. The PoP denotes the location of a routing destination having an access point to an external network.

(2) Operations

Next, the information processing operation of the load distribution system including the routing control system 1 will be explained.

(2-1) Policy Determination (S10 to S12)

First, the policy determination processing will be explained with reference to FIG. 1A.

According to the embodiment, first, at step S10, the policy determination apparatus 10 continuously collects monitoring data from the probe server 41 and/or monitoring system 42, and thereby monitors the usage and performance of the network facilities. Alternatively, the policy determination apparatus 10 may directly collect information that indicates the loads of the CDNs 100 or edge servers 70, or may collect it by way of the routing control apparatus 30.

On the other hand, the policy determination apparatus 10 receives a policy update (or generation) request from a routing control apparatus 30 (step S11). This request may be output from the routing control apparatus 30 at regular intervals, or a change to the configuration of the edges relating to zones may trigger the request to be output from the routing control apparatus 30. Together with a policy update request, the routing control apparatus 30 may transmit to the policy determination apparatus 10 the acquired information relating to the CDNs 100, edge servers 70, or origin server 60.

Next, at step S12, the policy determination apparatus 10 determines a policy based on the monitoring data previously collected at step S10, and thereafter performs an operation of returning the latest policy to the routing control apparatus 30. That is, the policy determination apparatus 10 is configured to derive or calculate multiple types of metrics from the collected monitoring data, and generate or update a policy based on the calculated metrics.

For instance, the monitoring data collected by the policy determination apparatus 10 may include, as dynamic data, an operation log and monitoring results of the states of networks, and, as static data, preference conditions set by customers, contract descriptions, contract fees for each CDN and the like. The policy determination apparatus 10 may acquire the schedule for distributing the data held by the origin server 60, and, based on the acquired distribution schedule, may determine a policy designating a specific edge to be selected on a priority basis for a time slot in which specific data is distributed. Alternatively, the policy determination apparatus 10 may acquire priorities (preference standards) of the metrics and evaluate the routing destination candidates in accordance with the priorities, and/or may acquire weights (routing proportions) of the edges and determine a policy in accordance with the weights. The policy may be individually determined for each origin server 60, or commonly determined for multiple origin servers. The routing control apparatus 30 stores the latest policy received from the policy determination apparatus 10 at step S12 in a not-shown storage unit.

Instead of using a policy update request from the routing control apparatus 30 at step S11 as a trigger as indicated above, the policy determination apparatus 10 may be configured to regularly determine a policy for the routing control apparatuses 30 and report it to the routing control apparatuses 30. That is, the policy determination apparatus 10 may regularly derive or calculate multiple types of metrics from the collected monitoring data, and generate or update the policy based on the calculated metrics.

(2-2) Routing Control by DNS Routing Control Apparatus

Next, as a first example of routing control, the procedure and details of the request routing control performed by a DNS routing control apparatus 30 will be explained with reference to FIG. 1A.

(2-2-1) Routing Control Example 1-1 (S31 to S36)

When the end user 50A is trying to access the origin server (data server) 60 to request distribution of content in FIG. 1A, the routing control according to Example 1 will be performed as indicated below.

First, at step S31, the end user 50A sends an inquiry, as an access request, to the DNS resolver 80 designated by the end user 50A, about a destination IP address for accessing the origin server 60 (e.g., origin.example.com) for name resolution. The DNS resolver 80 may be a specifically designed server, or a program to be implemented by the end user 50A.

Next, at step S32, the DNS resolver 80 that has received the inquiry from the end user 50A sends an inquiry to the routing control apparatus 30A, which is an authoritative DNS server holding the information of origin.example.com. Upon receipt of the inquiry, the routing control apparatus 30A acquires information included in this inquiry as address information, and stores the information in the not-shown storage unit. The routing control apparatus 30A, which has received the inquiry about the information of origin.example.com from the DNS resolver 80, further reads out the address information stored in this storage unit, and designates the edge server 70A as a routing destination in accordance with the policy generated by the policy determination apparatus 10.

At step S33, the routing control apparatus 30A sends a response regarding the routing destination information to the DNS resolver 80. Here, the routing destination information transmitted from the routing control apparatus 30A to the DNS resolver 80 at step S33 includes the IP address of the edge server 70A.

Next, at step S34, the DNS resolver 80 sends a response to the end user 50A regarding the routing destination information received from the routing control apparatus 30A.

At step S35, the end user 50A starts an access to the edge server 70A, which is the designated routing destination. If the edge server 70A holds the cache of the content requested by the end user 50A, the process is terminated.

If the edge server 70A does not hold the cache of the content requested by the end user 50A, the edge server 70A accesses the origin server 60 at step S36 to acquire the content from the origin server 60.

In this manner, the routing destination designated by the routing control apparatus 30A is allowed to deliver the content held by the origin server 60 to the end user 50A.

(2-2-2) Routing Control Example 1-2 (S31 to S48)

FIG. 1B is a diagram showing the second example of the overall configuration of a load distribution system including the policy determination apparatus 10 that uses routing destination evaluation data generated by the routing destination evaluation apparatus 11 according to the embodiment of the present embodiment and the processing flow of this system. In particular, FIG. 1B shows a flow of a process in which, when the end user 50A is trying to access the origin server 60 to request distribution of content, the routing control apparatus 30A selects the CDN 100 as a routing destination instead of an edge server 70. Steps S10 to S12 and S31 in FIG. 1B are the same as steps S10 to S12 and S31 in FIG. 1A, and therefore these steps are omitted from the explanation.

After step S31, the DNS resolver 80 that has received an inquiry from the end user 50A sends an inquiry at step S32 to the routing control apparatus 30A, which is an authoritative DNS server holding the information of origin.example.com. Upon receipt of the inquiry, the routing control apparatus 30A acquires information included in this inquiry as address information, and stores the information in the not-shown storage unit. The routing control apparatus 30A, which has received the inquiry about the information of origin.example.com from the DNS resolver 80, further reads out the address information stored in this storage unit, and designates the CDN 100B as a routing destination in accordance with the policy generated by the policy determination apparatus 10.

At step S43, the routing control apparatus 30A sends the routing destination information as a response to the DNS resolver 80. Since the IP address of the cache server in the CDN 100B that is the routing destination is unknown for the routing control apparatus 30, the DNS resolver 80 is introduced to the authoritative DNS server 90 of the CDN 100B at step S43.

At step S44, the DNS resolver 80 sends an inquiry to the authoritative DNS server 90 of the CDN 100B about the IP address corresponding to the domain name of the origin server 60.

At step S45, the authoritative DNS server 90 of the CDN 100B returns information regarding a suitable edge server in the CDN 100B, or in other words the IP address of this edge server, to the DNS resolver 80.

At step S46, the DNS resolver 80 sends as a response to the end user 50 the routing destination information received from the authoritative DNS server 90 regarding the edge server of the CDN 100B.

At step S47, the end user 50A begins to access the edge server of the CDN 100B designated as a routing destination. If the edge server holds the cache of the content requested by the end user 50A, the process is terminated.

If the edge server of the CDN 100B does not hold the cache of the content requested by the end user 50A, the edge server accesses the origin server 60 and acquires the content from the origin server 60 at step S48.

In this manner, the routing destination designated by the routing control apparatus 30A is allowed to deliver the content held by the origin server 60 to the end user 50A.

At step S33 in FIG. 1A or at step S43 in FIG. 1B, it is possible that the routing control apparatus 30A may provide the DNS resolver 80 with a designation of the origin server 60 as a routing destination, instead of an edge server.

When the end user 50A wishes to upload data to the origin server 60, the end user 50A also needs to send a request to the origin server 60 or a suitable edge server. The above flow is therefore applicable regardless of whether the flow of the targeted data of a request is in a downstream direction or upstream direction.

The routing control system 1 described above with reference to FIGS. 1A and 1B realizes control of the routing destination of requests from end users 50 in a dynamic and intelligent manner. That is, the policy determination apparatus 10 serves as the brain to dynamically determine the policy based on the collected monitoring data. The routing control apparatus 30 arranged in each zone performs the actual operation, selecting a suitable routing destination from a plurality of edge servers in accordance with the policy defined by the policy determination apparatus 10 serving as the brain.

For instance, with respect to the edge servers to which nonzero values are assigned as proportions according to the policy, the routing control apparatus 30 in the routing control system 1 may use these values as weights for the weighted round robin when assigning the requests. The policy determination apparatus 10 in the routing control system 1 may determine different policies for different time frames, for example between daytime and nighttime.

(2-3) Routing Control by HTTP Routing Control Apparatus

Next, as the second example of the routing control, the request routing control performed by an HTTP routing control apparatus 20 will be explained.

(2-3-1) Routing Control Example 2-1 (S21 to S23)

FIG. 1C is a diagram showing the third example of the overall configuration of a load distribution system including a policy determination apparatus 10 that uses routing destination evaluation data generated by the routing destination evaluation apparatus 11 according to the embodiment of the present embodiment and the processing flow of this system. In the exemplary processing flow of FIG. 1C, the routing control apparatuses 20A, 20B . . . are adopted as examples of the routing control apparatuses 20. A routing control apparatus 20 may correspond to an L7 load balancer (also referred to as a HTTP load balancer). In particular, FIG. 1C shows a flow of a process in which, when the end user 50A is trying to access the origin server 60 to request distribution of content, the routing control apparatus 20A designates the edge server 70A as a routing destination. Steps S10 to S12 in FIG. 1C are the same as steps S10 to S12 in FIGS. 1A and 1B, and therefore these steps are omitted from the explanation.

When the end user 50A is trying to access the origin server (data server) 60 to request distribution of content, the routing control according to Example 2 is performed as indicated below. It is assumed here that the end user 50A is connected to the routing control apparatus 20A of a specific zone #1 with a scheme such as DNS name resolution or anycast.

First, at step S21, the end user 50A sends, as an access request, an HTTP request to the routing control apparatus 20A. The routing control apparatus 20A receives the HTTP request, acquires the address information included in this HTTP request, and stores it in the not-shown storage unit. The routing control apparatus 20A may store the HTTP request itself in the storage unit.

Next, at step S22, the routing control apparatus 20A selects the edge server 70A as a routing destination in accordance with the policy stored in the storage unit, and transfers the HTTP request to the edge server 70A. Here, the routing control apparatus 20A may take into consideration, in addition to the policy, the description of the request included in the HTTP request, the type of target data, information of the end user 50A and the like when selecting the routing destination. If the edge server 70A holds the cache of the content requested by the end user 50A, the process is terminated.

If the edge server 70A does not hold the cache of the content requested by the end user 50A, the edge server 70A transfers the request to the origin server 60 at step S23.

As a result, the routing destination designated by the routing control apparatus 20A is allowed to deliver the content held by the origin server 60 to the end user 50A.

(2-3-2) Routing Control Example 2-2 (S21 to S53)

Figure 1D:
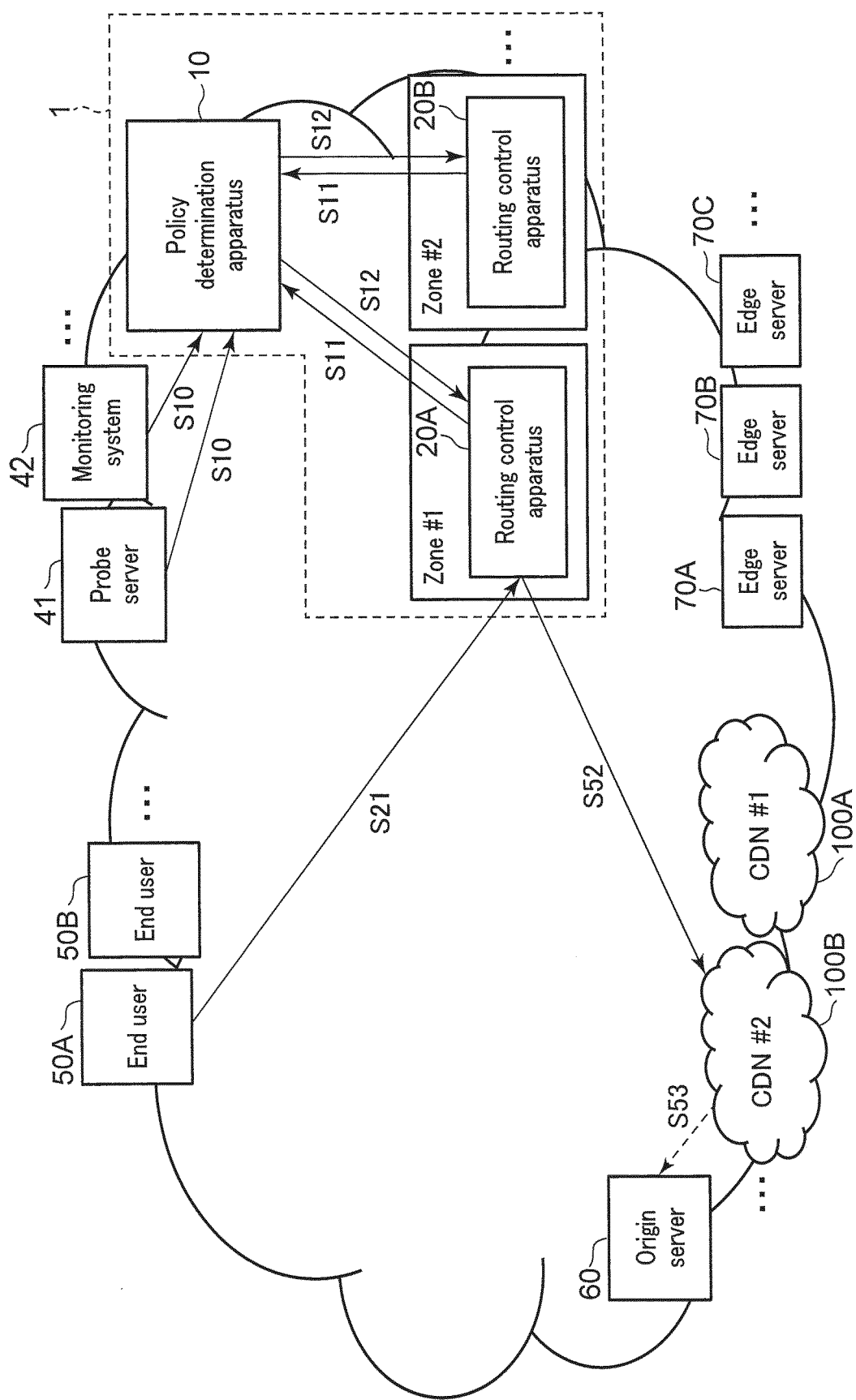
FIG. 1D is a diagram showing another exemplary load distribution system including a routing destination evaluation apparatus according to the present embodiment.

FIG. 1D is a diagram showing the fourth example of the overall configuration of a load distribution system including a policy determination apparatus 10 that uses routing destination evaluation data generated by a routing destination evaluation apparatus 11 according to the embodiment of the present embodiment and the processing flow of this system. In particular, FIG. 1D shows a flow of a process in which, when the end user 50A is trying to access the origin server 60 to request distribution of content, the routing control apparatus 20A designates the CDN 100 instead of an edge server 70 as a routing destination. Steps S10 to S12 in FIG. 1D are the same as steps S10 to S12 in FIGS. 1A to 1C, and therefore these steps are omitted from the explanation. Furthermore, step S21 in FIG. 1D is the same as step S21 in FIG. 1C, and therefore this step is omitted from the explanation.

At step S52, which follows step S21, the routing control apparatus 20A selects the CDN 100B as a routing destination in accordance with the policy stored in the storage unit, and transfers the HTTP request to the CDN 100B. Here, the routing control apparatus 20A may select the routing destination based on, in addition to the policy, the description of the request included in the HTTP request, the type of target data, information of the end user 50A, and the like. If the edge server to which the HTTP request is transferred in the CDN 100B holds the cache of the content requested by the end user 50A, the process is terminated.

If the edge server of the CDN 100B does not hold the cache of the content requested by the end user 50A, this edge server transfers the request to the origin server 60 at step S53.

As a result, the routing destination designated by the routing control apparatus 20A is allowed to deliver the content held by the origin server 60 to the end user 50A.

At step S22 or S52, it is possible that the routing control apparatus 20A may designate the origin server 60 instead of an edge server as a routing destination.

When the end user 50 wishes to upload data to the origin server 60, the end user 50 is also required to send a request to the origin server 60 or a suitable edge server. The above flow is therefore applicable regardless of whether the flow of the targeted data of a request is in a downstream direction or upstream direction.

The routing control system 1 including the routing control apparatuses 20A, 20B . . . explained above with reference to FIGS. 1C and 1D is capable of controlling the routing destinations of HTTP requests from end users 50 in a dynamic and intelligent manner. That is, the policy determination apparatus 10 serves as the brain to dynamically determine the policy based on the collected monitoring data. The routing control apparatus 20 arranged in each zone performs the actual operation, selecting a suitable routing destination from a plurality of edge servers in accordance with the policy defined by the policy determination apparatus 10 serving as the brain.

For instance, the routing control system 1 may be configured to select a routing destination in accordance not only with the policy but also with the information included in the HTTP request. In general, an HTTP request includes information of the end user 50 and information relating to the to-be-transmitted data. The routing control system 1 therefore may be configured to change the routing destinations in accordance with the device type or agent of the end user 50 or the type or content of the transmission target data.

The routing control apparatus 20 in the routing control system 1 may assign the requests to the edge servers to which nonzero proportions are assigned in the policy, by using these proportions as weights for the weighted round robin. The policy determination apparatus 10 in the routing control system 1 may determine different policies for different time frames, for example between daytime and nighttime.

In particular, when viewed from the content side, the available services and functions vary among CDNs 100 provided by different CDN business operators. Using the routing control apparatus 20, requests may be received by the CDN 100 of each CDN business operator, and thereafter may be routed to specific edge servers 70 so that the content side is not aware of such differences.

Embodiments

With reference to the drawings, the policy determination apparatus 10 including the routing destination evaluation apparatus 11 according to the present embodiment will be explained. In the following explanation, the routing control apparatus 20 and routing control apparatus 30 are basically not distinguished from each other, and will be referred to as routing control apparatuses 20.

(1) Configuration

Figure 2:
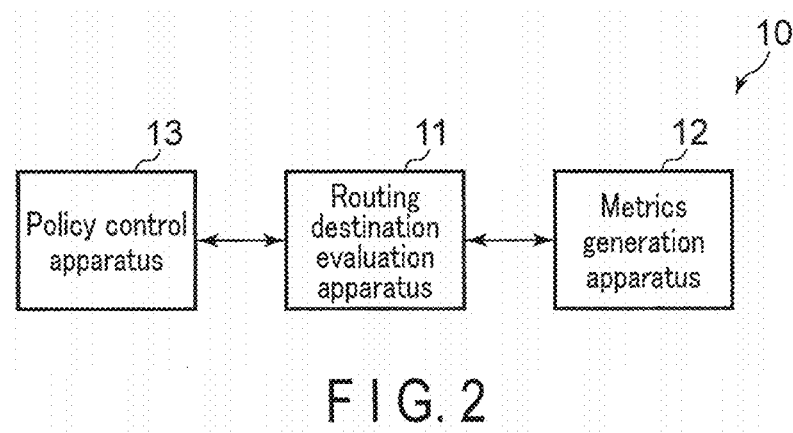
FIG. 2 is a block diagram showing an exemplary policy determination apparatus having a routing destination evaluation apparatus according to the present embodiment.

FIG. 2 is a block diagram showing an example of the policy determination apparatus 10 having the routing destination evaluation apparatus 11 according to the present embodiment. The policy determination apparatus 10 in FIG. 2 includes a routing destination evaluation apparatus 11, a metrics generation apparatus 12, and a policy control apparatus 13. The policy determination apparatus 10 may be referred to as a policy determination system. The division of functions illustrated in FIG. 2 is a mere example, and the policy determination apparatus 10 may be a single computer or multiple computers incorporating some or all of the functions of the routing destination evaluation apparatus 11, metrics generation apparatus 12, and policy control apparatus 13.

The routing destination evaluation apparatus 11 evaluates multiple candidates of the routing destinations to which the routing control apparatus 20 routes requests, based for example on metrics data provided by the metrics generation apparatus 12, and generates routing destination evaluation data. The routing destination evaluation apparatus 11 provides this routing destination evaluation data to the policy control apparatus 13 or other external devices via a network, for example.

The metrics generation apparatus 12 generates metrics data, which is time-series data of items of metrics, indicating the states of candidates selectable as request routing destinations, based on monitoring data collected by the aforementioned probe server 41 and/or monitoring system 42, for example. The metrics generation apparatus 12 provides this metrics data to the routing destination evaluation apparatus 11 or other external devices via a network, for example.

The policy control apparatus 13 determines the policy to be used by the routing control apparatus 20, based for example on the routing destination evaluation data provided by the routing destination evaluation apparatus 11 or weights set by the customer device, and informs the routing control apparatus 20 of the policy.

As illustrated in FIG. 3, the routing destination evaluation apparatus 11 according to the present embodiment includes a communication interface (I/F) 110, a processor 120, and a memory 130.

The communication I/F 110 may include one or more wired or wireless communication interface units, enabling transmission and reception of various types of information between the metrics generation apparatus 12 and policy control apparatus 13, and also not-shown other external devices such as customer devices in accordance with a communication protocol used for the network. The communication I/F 110 may be an optical communication module.

The processor 120 is typically a central processing unit (CPU) and/or a graphics processing unit (GPU). The processor 120 may also be a microcomputer, a field programmable gate array (FPGA), a digital signal processor (DSP), or any other general-purpose or special-purpose processor. The processor 120 performs, for instance, input/output control, communication control, processes relating to the evaluation of routing destination candidates (edges), and the like.

The memory 130 temporarily stores programs to be executed by the processor 120 in order to implement the different processes, and data to be used by the processor 120, such as metrics data, setting data, and routing destination evaluation data. The memory may include a RAM having a work area in which the program or data is expanded.

By executing the program stored in the memory 130, the processor 120 realizes the functions of a metrics acquisition unit 121, a priority acquisition unit 122, an update condition determination unit 123, an update request unit 124, a routing destination evaluation unit 125, an evaluation providing request acquisition unit 126, and an evaluation providing unit 127 as illustrated in FIG. 3. The memory 130 may include a metrics storage unit 131, a setting data storage unit 132, and an evaluation data storage unit 133.

The communication I/F 110 is configured to receive various kinds of data from external devices and transmit it to the processor 120, or to transmit various kinds of data received from the processor 120 to external devices.

For instance, the communication I/F 110 receives metrics data from the metrics generation apparatus 12 or other external devices via a network, and transmits this to the metrics acquisition unit 121. The communication I/F 110 also receives the priorities from the customer device or external device via the network, and transmits them to the priority acquisition unit 122.

The communication I/F 110 further receives an evaluation providing request, which will be described later, from the policy control apparatus 13 or other external devices via the network, and transmits the request to the evaluation providing request acquisition unit 126. On the other hand, the communication I/F 110 receives from the evaluation providing unit 127 routing destination evaluation data targeted by the evaluation providing request and data that identifies the request-sender external device, and transmits the routing destination evaluation data to the external device via the network.

The metrics acquisition unit 121 acquires the metrics data receive by the communication I/F 110, and writes this data into the metrics storage unit 131 of the memory 130.

The metrics storage unit 131 may store, as metrics data, the routing destination candidates in association with multiple types of metrics values of the candidates and/or their scores at a given time point. The metrics data will be described later in detail. The metrics storage unit 131 may store a value and a score for each edge and for each item of the metrics. The metrics data stored in the metrics storage unit 131 may be read out by the update condition determination unit 123 and/or routing destination evaluation unit 125.

The setting data storage unit 132 stores various types of setting data. The setting data here may include parameters relating to the evaluation of the routing destinations, data of the routing control apparatuses 20 subordinate to the policy determination apparatus 10, data relating to the routing destination candidates selectable for the routing control apparatus 20, and the like.

The parameters relating to the evaluation of the routing destinations may include priorities assigned to respective items of the metrics, parameters designating the number of routing destination candidates (designated number of edges) that can be included in a ranking which serves as routing destination evaluation data, various threshold values, and the like, which are used for scoring the routing destination candidates with a weighted sum of the metrics.

The setting data storage unit 132 stores various parameters. These parameters include standard values designated by the server of a company or organization that runs and manages this routing control system 1 or by the origin server 60 or customer device operated and managed by a content distributor or an IoT data collecting business operator. The parameters may also include arbitrary values set through the API or the like by any external device that requires the later-mentioned routing destination evaluation data. The arbitrary values are transmitted from the external device together with an evaluation providing request, or in association with the evaluation providing request, and are stored in the setting data storage unit 132 by the priority acquisition unit 122 that has acquired the values via the communication I/F 110. Alternatively, the arbitrary values may be received from a customer device, independently from an evaluation providing request. FIG. 8 is a diagram showing exemplary content stored in this setting data storage unit 132. The setting data storage unit 132 stores similar information for every origin server 60. The setting data storage unit 132 stores the priorities and the designated number k of edges. In this example, two types of metrics, RTT and costs, are set as priorities. The metrics for setting the priorities, however, are not limited to these, and the number of metrics types is also not limited to two.

The priority acquisition unit 122 acquires the priorities received by the communication I/F 110, and writes these into the setting data storage unit 132 of the memory 130. For instance, the priority acquisition unit 122 may register the received priorities as arbitrary values of the priorities indicated in FIG. 8. The priority acquisition unit 122 may acquire parameters other than priorities, such as the designated number of edges. If this is the case, the priority acquisition unit may be instead referred to as a parameter acquisition unit. The routing destination evaluation unit 125 may evaluate a routing destination candidate using a standard value if an arbitrary value is not entered for each parameter, and using an arbitrary value if an arbitrary value is entered.

The update condition determination unit 123 determines whether or not a predetermined evaluation update condition is satisfied. When it is determined that the evaluation update condition is satisfied, the update condition determination unit 123 notifies the update request unit 124 that the evaluation update condition has been satisfied.

For instance, the evaluation update condition may be that the metrics and/or their scores stored in the metrics storage unit 131 either have been changed or have changed beyond a threshold value. Alternatively, the evaluation update condition may be that a length of time that exceeds a threshold has elapsed after the previous evaluation of routing destination candidates. The evaluation update condition may be that an evaluation providing request is received from the policy control apparatus 13 or some other external device.

Upon the notification from the update condition determination unit 123 of the evaluation update condition being satisfied, the update request unit 124 sends a request for an evaluation update to the routing destination evaluation unit 125.

The routing destination evaluation unit 125 reads the metrics data from the metrics storage unit 131, and the parameters including priorities from the setting data storage unit 132. Based on the metrics data and parameters, the routing destination evaluation unit 125 evaluates the routing destination candidates and generates the routing destination evaluation data. The routing destination evaluation unit 125 stores the routing destination evaluation data in the evaluation data storage unit 133.

The evaluation update request from the update request unit 124 triggers the routing destination evaluation unit 125 to evaluate the routing destination candidates. Alternatively, upon receiving an evaluation providing request from the evaluation providing unit 127, the routing destination evaluation unit 125 may generate routing destination evaluation data targeted by this request. The evaluation providing request may include routing destination candidates targeted by the request, priorities, a designated number of edges, and the like.

The routing destination evaluation unit 125 can evaluate multiple routing destination candidates based on the time-series data of multiple types of metrics associated with these candidates, and the priorities assigned to the metrics of these types. For instance, the routing destination evaluation unit 125 may determine the evaluation value (edge score) of each routing destination candidate by obtaining a weighted addition of (the scores of) multiple types of metrics of the candidate in accordance with the priority assigned to each type of the metrics. An example of scoring is shown in FIG. 9, where "Edge 1", "Edge 2", . . . and "Edge 7" correspond to the routing destination candidates, and the priorities assigned to the "RTT score" and "cost score" are "0.8" and "0.2", respectively. The priorities may be set in accordance with the preferences of the administrator of the policy determination apparatus 10, routing control apparatus 20, and/or origin server 60. In the example of FIG. 9, greater importance is placed on "RTT" than "costs". However, greater importance may be placed on "costs" instead, or on (the scores of) metrics other than "costs" and "RTT".

The routing destination evaluation data includes, for example, a plurality of routing destination candidates and their evaluation values (edge scores). Furthermore, the routing destination evaluation data may be ranking data in which routing destination candidates are ranked in ascending or descending order of their evaluation values.

When generating ranking data as routing destination evaluation data, the routing destination evaluation unit 125 does not need to include all the edges in the ranking. In particular, the routing destination evaluation unit 125 may take the edges having the first to k-th scores into consideration for the ranking in accordance with the designated number k of edges, which is one of the parameters stored in the setting data storage unit 132, or may eliminate candidates that are not in an available state.

The evaluation data storage unit 133 stores the routing destination evaluation data generated by the routing destination evaluation unit 125. The routing destination evaluation data stored in the evaluation data storage unit 133 may be read out by the evaluation providing unit 127.

The evaluation providing request acquisition unit 126 acquires an evaluation providing request transmitted from an external device and received by the communication I/F 110. Here, the target of the evaluation providing request may include at least a portion of the multiple routing destination candidates. The evaluation providing request acquisition unit 126 transmits an evaluation providing request to the evaluation providing unit 127.

The evaluation providing unit 127 receives the evaluation providing request from the evaluation providing request acquisition unit 126. The evaluation providing unit 127 prepares routing destination evaluation data targeted by this request, and provides this data to the request source via the communication I/F 110. The evaluation providing unit 127 may extract necessary data from the routing destination evaluation data stored in the evaluation data storage unit 133, or send a request for generation of the necessary data to the routing destination evaluation unit 125.

In the example of FIG. 3, the evaluation providing unit 127 provides the routing destination evaluation data in response to an evaluation providing request. The routing destination evaluation data may be provided to the policy control apparatus 13 or other external devices, for example, at regular intervals.

Figure 4:
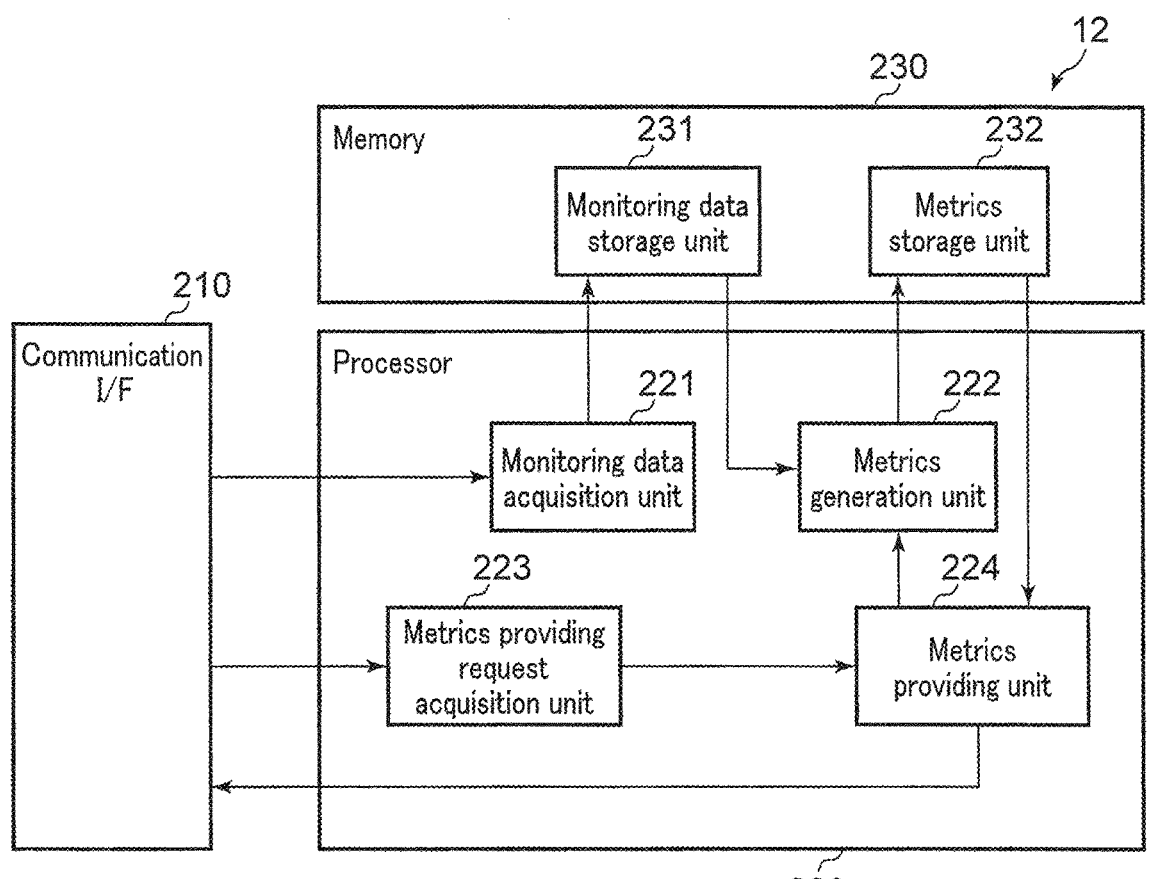
FIG. 4 is a block diagram showing a metrics generation apparatus in FIG. 2.

The metrics generation apparatus 12 of FIG. 2 includes a communication I/F 210, a processor 220, and a memory 230, as illustrated in FIG. 4.

The communication I/F 210 may include one or more wired or wireless communication interface units, enabling transmission and reception of various types of information between the routing destination evaluation apparatus 11, the probe server 41 and/or monitoring system 42, and other not-shown external devices, in accordance with a communication protocol used for the network. The communication I/F 210 may be an optical communication module.

The processor 220 is typically a CPU and/or GPU, but it may also be a microcomputer, FPGA, DSP, or any other general-purpose or special-purpose processor. The processor 220 may perform processing relating to input/output control, communication control, metrics generation, and the like.

The memory 230 temporarily stores programs to be executed by the processor 220, with which the processor 220 can implement the processing, and data to be used by the processor 220, such as monitoring data and metrics data. The memory may include a RAM having a work area in which the program or data is expanded.

By executing the program stored in the memory 230, the processor 220 realizes the functions of a monitoring data acquisition unit 221, a metrics generation unit 222, a metrics providing request acquisition unit 223, and a metrics providing unit 224 illustrated in FIG. 4. The memory 230 may include a monitoring data storage unit 231 and a metrics storage unit 232.

The communication I/F 210 is configured to receive various types of data from external devices and transmit it to the processor 220, or to transmit various kinds of data received from the processor 220 to external devices.

For instance, the communication I/F 210 receives monitoring data relating to the conditions of the facilities of a network from the probe server 41 or monitoring system 42 via the network, and transmits this to the monitoring data acquisition unit 221. Here, the monitoring data may include data indicating the states of candidates, such as edge servers 70 and/or CDNs 100, which can be selected by the routing control apparatuses 20 subordinate to the policy determination apparatus 10 as routing destinations of requests including destination data from an end user 50 to the origin server 60. The states of the routing destination candidates here may include or may not include some or all of the loads of the candidates, response time (e.g., round-trip time (RTT)), costs (communication charges), availability, the number of connections, the number of clients, volume of data communications, and the like.

The communication I/F 210 receives a metrics providing request, which will be described later, from the routing destination evaluation apparatus 11 or other external devices via the network, and transmits the request to the metrics providing request acquisition unit 223. On the other hand, the communication I/F 210 receives the metrics targeted by the metrics providing request and data that identifies the request-sender external device from the metrics providing unit 224, and transmits the metrics to the external device via the network.

The monitoring data acquisition unit 221 acquires the monitoring data received by the communication I/F 210, and writes this data into the monitoring data storage unit 231 of the memory 230.

The monitoring data storage unit 231 stores the monitoring data acquired by the monitoring data acquisition unit 221. The monitoring data stored in the monitoring data storage unit 231 may be read out by the metrics generation unit 222.

The monitoring data storage unit 231 associates the monitoring data with respective edges when storing. FIG. 6 is a diagram showing exemplary content stored in this monitoring data storage unit 231. The monitoring data storage unit 231 stores similar information for every origin server 60. Here, the data is presented in the form of a table, which is not a limitation. The monitoring data storage unit 231 stores information of defined metrics such as qualities including availability and round-trip time (RTT), costs, and the like, for each edge. The costs denote values calculated based on various fees including transit fees corresponding to the volume of data transmission and reception and electric power charges for running the edge servers. The monitoring data may be throughputs, the number of requests, or any other type of data, and any information acquirable at the probe server 41 and/or monitoring system 42 can be adopted. The monitoring data can be freely determined by the server of a company or organization that runs and manages this routing control system 1, or by the origin server 60 or customer device that is operated and managed by a content distributor or an IoT data collecting business operator.

The metrics generation unit 222 reads the monitoring data stored in the monitoring data storage unit 231, based on which the metrics generation unit 222 generates time-series data (metrics data) of multiple kinds of metrics in association with respective routing destination candidates. The metrics generation unit 222 stores the generated metrics data in the metrics storage unit 232.

As mentioned above, the metrics are an indicator that indicates the state of a candidate selectable as a request routing destination. The metrics data is expressed by time stamps and metrics values. The metrics at a given time point may be a value as-is contained in the monitoring data, or a manipulated value or statistical value of this contained value. The metrics generation unit 222 may generate metrics for every unit of time, for example, every second.

The metrics generation unit 222 may normalize the metrics value of a given type at a given time point, for example as a score between 0 and 1. The metrics generation unit 222 may use a sigmoid function to normalize the metrics value. The normalized metrics value may be referred to as a (metrics) score.

Upon receiving a metrics providing request from the metrics providing unit 224, the metrics generation unit 222 may generate metrics targeted by this request. The metrics providing request may include information designating the requested edge, period and/or type of metrics. In other words, in response to a metrics providing request, provision of time-series data of a specific type of metrics for a specific edge over a specific period of time can be realized.

The metrics associated with a given routing destination candidate may include first metrics relating to the request transmission costs when selecting this candidate as a routing destination, second metrics relating to request transmission quality when selecting this candidate as a routing destination, and the like. The first metrics may be various costs incurred when the candidate is selected, such as charges for the CDN as a candidate, electric power charge of the edge server as a candidate, and the like. The second metrics may be the availability, RTT, packet loss rate, and the like of the edge.

The metrics storage unit 232 may store, as metrics data, the routing destination candidates in association with multiple types of metrics values of the candidates and/or their scores at a given time point. FIG. 7 shows an example of RTT and cost metrics, as well as their scores, for each routing destination candidate (edge). Here, the metrics data is indicated in the form of a table, which is not a limitation. The metrics storage unit 232 stores a value and a score for each edge and for each item of the metrics. The metrics data stored in the metrics storage unit 232 may be read out by the metrics providing unit 224.

The metrics providing request acquisition unit 223 acquires a metrics providing request transmitted from an external device and received by the communication I/F 210. Here, the target of the metrics providing request may include at least a portion of the time-series data of the metrics of multiple types associated with at least a portion of the routing destination candidates. The metrics providing request acquisition unit 223 transmits the metrics providing request to the metrics providing unit 224.

The metrics providing unit 224 receives the metrics providing request from the metrics providing request acquisition unit 223. The metrics providing unit 224 prepares metrics data targeted by this request, and provides this data to the request source via the communication I/F 210. Here, the metrics providing unit 224 may extract necessary data from the metrics data stored in the metrics storage unit 232, or may send a request for generation of the necessary data to the metrics generation unit 222.

In the example of FIG. 4, the metrics providing unit 224 provides the metrics data in response to a metrics providing request. The routing destination evaluation data may be provided to the routing destination evaluation apparatus 11 or other external devices, for example, at regular intervals.

Figure 5:
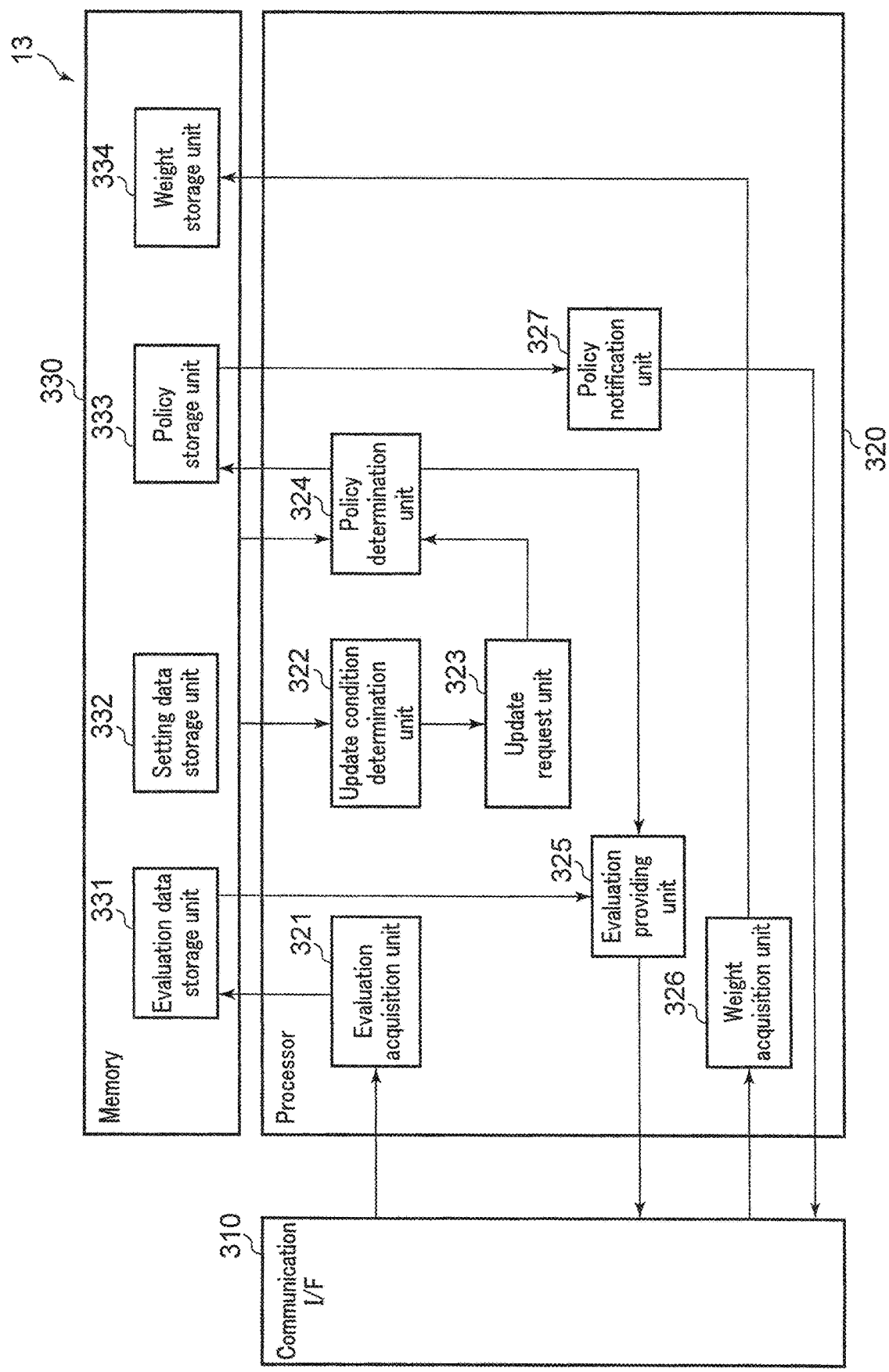
FIG. 5 is a block diagram showing a policy control apparatus in FIG. 2.

The policy control apparatus 13 of FIG. 2 includes a communication I/F 310, a processor 320, and a memory 330, as illustrated in FIG. 5.

The communication I/F 310 may include one or more wired or wireless communication interface units, enabling transmission and reception of various types of information between the routing destination evaluation apparatus 11 and other not-shown external devices such as customer devices, in accordance with a communication protocol used for the network. The communication I/F 310 is also used for data communications with the routing control apparatuses 20. The communication I/F 310 may be an optical communication module.

The processor 320 is typically a CPU and/or GPU, but it may also be a microcomputer, FPGA, DSP, or any other general-purpose or special-purpose processor. The processor 320 may perform processing relating to input/output control, communication control, policy determination, and the like.

The memory 330 temporarily stores programs to be executed by the processor 320 so as to realize different processes, and data to be used by the processor 320 such as routing destination evaluation data, setting data, weights, and policies. The memory may include a RAM having a work area in which the program or data is expanded.

By executing the program stored in the memory 330, the processor 320 may realize the functions of an evaluation acquisition unit 321, an update condition determination unit 322, an update request unit 323, a policy determination unit 324, an evaluation providing unit 325, a weight acquisition unit 326, and a policy notification unit 327 illustrated in FIG. 5. The memory 330 may include an evaluation data storage unit 331, a setting data storage unit 332, a policy storage unit 333, and a weight storage unit 334.

The communication I/F 310 is configured to receive various kinds of data from external devices and transmit it to the processor 320, or to transmit various kinds of data received from the processor 320 to external devices.

For instance, the communication I/F 310 receives the routing destination evaluation data from the routing destination evaluation apparatus 11 or some other external device via a network, and transmits this data to the evaluation acquisition unit 321. On the other hand, the communication I/F 310 receives routing destination evaluation data from the evaluation providing unit 325, and transmits this routing destination evaluation data to a customer device or some other external device via the network. Furthermore, the communication I/F 310 receives weights from the customer device or external device via the network, and transmits them to the weight acquisition unit 326.

Furthermore, the communication I/F 310 receives from the policy notification unit 327 the policy and the data (e.g., address) for identifying a routing control apparatus 20 that is a policy notification destination and is subordinate to the policy determination apparatus 10, and transmits the policy to this routing control apparatus 20 via a network. This policy is used by the notification-destination routing control apparatus 20 to regulate the destinations for routing the requests including the destination data from the end users 50 to the origin server 60.

The evaluation acquisition unit 321 acquires the routing destination evaluation data received by the communication I/F 310, and writes this data into the evaluation data storage unit 331 of the memory 330.

The evaluation data storage unit 331 stores the routing destination evaluation data acquired by the evaluation acquisition unit 321. The routing destination evaluation data stored in the evaluation data storage unit 331 is read out by various function units of the processor 320 such as the policy determination unit 324 and evaluation providing unit 325.

The update condition determination unit 322 determines whether or not a predetermined policy update condition is satisfied. When it is determined that the policy update condition is satisfied, the update condition determination unit 322 notifies the update request unit 323 that the policy update condition has been satisfied. If there are a plurality of routing control apparatuses 20 subordinate to the policy determination apparatus 10, the update condition determination unit 322 may determine, for each routing control apparatus 20, whether or not the policy update condition of the policy used by this routing control apparatus 20 is satisfied.

A policy update condition may be that a length of time that exceeds a threshold value has elapsed after the previous policy update (or determination). Alternatively, the policy update condition may be that a policy update request is received from a routing control apparatus 20 subordinate to the policy determination apparatus 10 and is stored in the memory 330.

Upon the notification of the policy update condition being satisfied from the update condition determination unit 322, the update request unit 323 sends a request for a policy update to the policy determination unit 324.

The policy determination unit 324 determines the policy based on the various types of data stored in the memory 330 and writes it into the policy storage unit 333 at the time of, for example, initial setting of the policy determination apparatus 10, setting of an additional routing control apparatus 20 subordinate to the policy determination apparatus 10, or reception of a policy update request from the update request unit 323. In order to determine the policy, the policy determination unit 324 may refer to the routing destination evaluation data stored in the evaluation data storage unit 331, setting data stored in the setting data storage unit 332, and/or weights stored in the weight storage unit 334.

The policy determination unit 324 may determine the policy based on the weights stored in the weight storage unit 334. In this case, the policy determination unit 324 may request the evaluation providing unit 325 to provide the latest routing destination evaluation data to a customer device in order to prompt the customer to input weights. On the other hand, when weights are not stored in the weight storage unit 334, or as default settings, the policy determination unit 324 may autonomously determine the policy based on the routing destination evaluation data.

When autonomously determining the policy, the policy determination unit 324 may narrow down the routing destination candidates to be included in the policy based on the scores of the candidates or the like. For instance, the policy determination unit 324 may eliminate candidates having edge scores ranked in a place below the predetermined ordinal place, such as below a place corresponding to the designated number of edges, according to the routing destination evaluation data. Alternatively, candidates having scores lower than a predetermined threshold value may be eliminated.

The policy determination unit 324 determines, based on the scores of the routing destination candidates included in the routing destination evaluation data or weights stored in the weight storage unit 334, weights indicating the proportions of candidates to which the routing control apparatus 20 using the to-be-determined policy routes requests. The policy determination unit 324 may include the weights stored in the weight storage unit 334 in the policy as they are, or determine the weight of a candidate as the proportion of the weight of the candidate to the total weights assigned to the routing destination candidates. Alternatively, as indicated in FIG. 10, the policy determination unit 324 may determine, as the weight of each candidate, the proportion of the score of the candidate to the total score of all the routing destination candidates to be included in the policy. These are exemplary methods for determining weights, and the weights may be predetermined in accordance with the order of scores. The weights may be used as weights for the weighted round robin scheme in the load distribution technique. That is, the routing control apparatus 20 that uses the policy of FIG. 10 routes 55% of the requests to Edge 1, and the remaining 45% to Edge 7.

The policy storage unit 333 stores the policy determined by the policy determination unit 324. The policy stored in the policy storage unit 333 is read out, for example by the policy notification unit 327.

The evaluation providing unit 325 provides the routing destination evaluation data to a customer device or other external devices by way of the communication I/F 310, in response to a request from the policy determination unit 324. If, however, the policy determination unit 324 does not determine a policy based on the weights set by the customer device, the evaluation providing unit 325 may not be required.

The weight acquisition unit 326 acquires weights received from the customer device by way of the communication I/F 310, and writes them into the weight storage unit 334 of the memory 330. If the policy determination unit 324 does not determine a policy based on the weights set by the customer device, the weight acquisition unit 326 may not be required. The weights are assigned by a customer who has browsed the routing destination evaluation data, to at least a portion of the routing destination candidates. Since the weights can be freely set by a customer, they may not always have a correlation with the evaluation values of the candidates in the routing destination evaluation data.

The weight storage unit 334 stores weights acquired by the weight acquisition unit 326. The weights stored in the weight storage unit 334 may be read out by the policy determination unit 324. If the policy determination unit 324 does not determine a policy based on the weights set by the customer device, the weight storage unit 334 may not be required.

When a new policy (including an updated policy) is stored in the policy storage unit 333, the policy notification unit 327 reads this policy out, and reports it to the corresponding routing control apparatus 20. In particular, the policy notification unit 327 transmits to the communication I/F 310 the policy and the data for identifying the routing control apparatus 20 to which the policy is reported, and the communication I/F 310 transmits the policy to this routing control apparatus 20 via a network.

(2) Operations

Next, the operations of the routing destination evaluation apparatus 11, metrics generation apparatus 12, and policy control apparatus 13 configured as above will be described.

Figure 11:
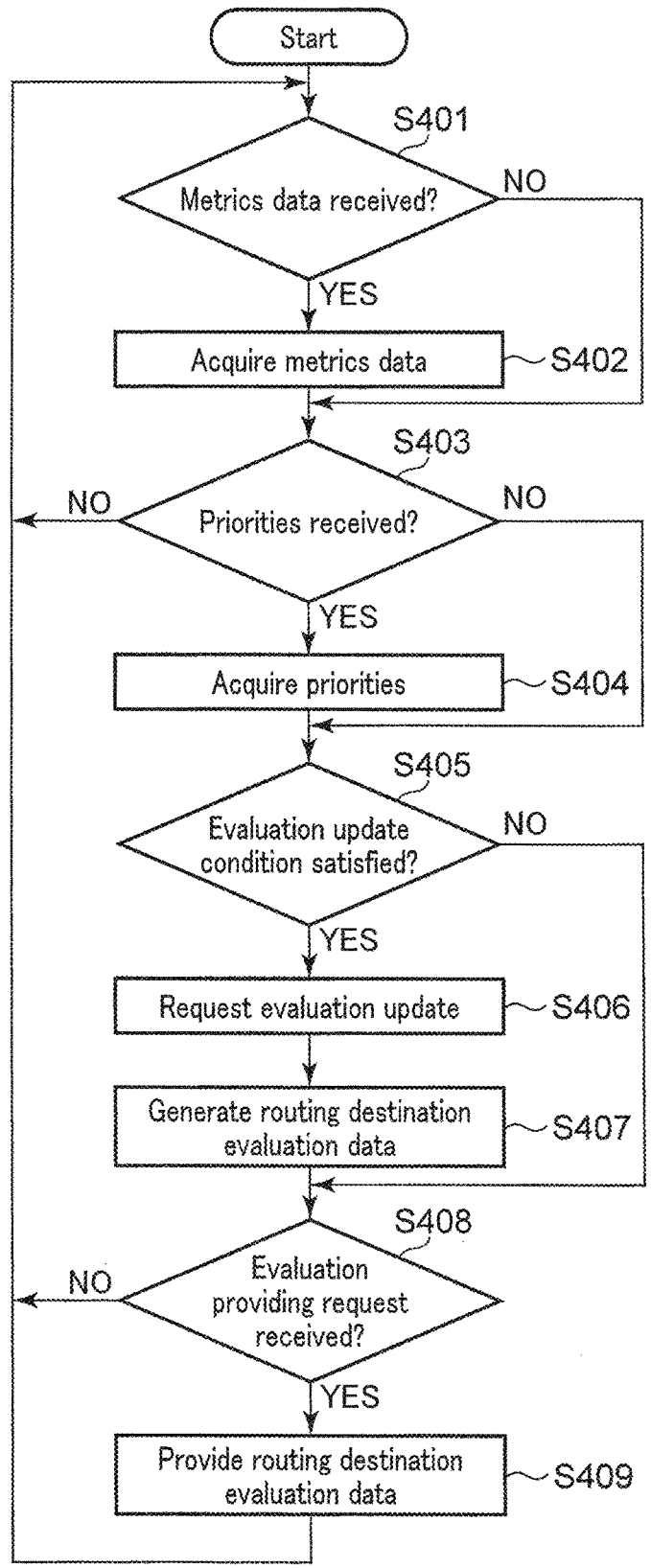
FIG. 11 is a flowchart showing an exemplary operation performed by the routing destination evaluation apparatus in FIG. 3.

FIG. 11 shows an exemplary operation performed by the routing destination evaluation apparatus 11. In the exemplary operation of FIG. 11, the communication I/F 110 awaits reception of metrics data, priorities, and an evaluation providing request (steps S401, S403 and S408). In the interim, the update condition determination unit 123 awaits the satisfaction of the evaluation update condition (step S405).

When the metrics data is received, the process proceeds to step S402. When the priorities are received, the process proceeds to step S404. When it is determined that the evaluation update condition is satisfied, the process proceeds to step S406. When an evaluation providing request is received, the process proceeds to step S409.

At step S402, the metrics acquisition unit 121 acquires the received metrics data, and writes this data into the metrics storage unit 131. After step S402, the communication I/F 110 awaits reception of metrics data, priorities, and an evaluation providing request (steps S401, S403 and S408), while the update condition determination unit 123 awaits the satisfaction of the evaluation update condition (step S405).

At step S404, the priority acquisition unit 122 acquires the received priority, and writes it into the setting data storage unit 132. After step S404, the communication I/F 110 awaits reception of metrics data, priorities, and an evaluation providing request (steps S401, S403 and S408), while the update condition determination unit 123 awaits the satisfaction of the evaluation update condition (step S405).

At step S406, the update request unit 124 requests the routing destination evaluation unit 125 to update the evaluation. In response to the request made at step S406, the routing destination evaluation unit 125 evaluates multiple routing destination candidates based on the metrics data stored in the metrics storage unit 131 and parameters including priorities stored in the setting data storage unit 132, and generates (updates) the routing destination evaluation data (step S407). After step S407, the communication I/F 110 awaits reception of metrics data, priorities, and an evaluation providing request (steps S401, S403 and S408), while the update condition determination unit 123 awaits the satisfaction of the evaluation update condition (step S405).

At step S409, the evaluation providing unit 127 prepares routing destination evaluation data corresponding to the received evaluation providing request, and provides the data to the external device, which is the request source, via the communication I/F 110. After step S409, the communication I/F 110 awaits reception of metrics data, priorities, and an evaluation providing request (steps S401, S403 and S408), while the update condition determination unit 123 awaits the satisfaction of the evaluation update condition (step S405).

In the exemplary operation of FIG. 11, the reception of an evaluation providing request triggers the evaluation providing unit 127 to provide the routing destination evaluation data. An update of the routing destination evaluation data (step S407) or the elapsing of a predetermined length of time after the previous implementation at step S409 may trigger the evaluation providing unit 127 to provide the routing destination evaluation data to the policy control apparatus 13 or other external devices.

FIG. 12 shows an exemplary operation performed by the metrics generation apparatus 12. In the exemplary operation of FIG. 12, the communication I/F 210 awaits reception of monitoring data and a metrics providing request (steps S501 and S504). Upon receipt of the monitoring data by the communication I/F 210, the process proceeds to step S502. Upon receipt of a metrics providing request by the communication I/F 210, the process proceeds to step S505.

At step S502, the monitoring data acquisition unit 221 acquires the received monitoring data and writes it into the monitoring data storage unit 231. Then, the metrics generation unit 222 generates metrics data based on the monitoring data acquired at step S502 (step S503). For instance, the metrics generation unit 222 may generate metrics data that includes a new time stamp, metrics, and/or score values of the metrics. After step S503, the communication I/F 210 awaits monitoring data and a metrics providing request (steps S501 and S504).

At step S505, the metrics providing unit 224 prepares metrics data corresponding to the received metrics providing request, and provides the data to the external device, which is a request source, via the communication I/F 210. After step S505, the communication I/F 210 awaits reception of monitoring data and a metrics providing request (steps S501 and S504).

In the exemplary operation of FIG. 12, the reception of a metrics providing request triggers the metrics providing unit 224 to provide metrics data; however, the generation of metrics data (step S503) or the elapsing of a predetermined length of time after the previous implementation at step S505 may trigger the metrics providing unit 224 to provide the metrics data to the routing destination evaluation apparatus 11 or other external devices.

FIG. 13 shows an exemplary operation performed by the policy control apparatus 13. In the exemplary operation of FIG. 13, the communication I/F 310 awaits reception of routing destination evaluation data (step S601). In the interim, the update condition determination unit 322 awaits the satisfaction of the policy update condition (step S603). When the routing destination evaluation data is received, the process proceeds to step S602. When it is determined that the policy update condition is satisfied, the process proceeds to step S604.

At step S602, the evaluation acquisition unit 321 acquires the received routing destination evaluation data, and writes the data into the evaluation data storage unit 331. After step S602, the communication I/F 310 awaits reception of the routing destination evaluation data (step S601), while the update condition determination unit 322 awaits the satisfaction of the policy update condition (step S603).

At step S604, the update request unit 323 requests the policy determination unit 324 to update the policy. In response to the request made at step S604, the policy determination unit 324 requests the evaluation providing unit 325 to provide the customer device with the routing destination evaluation data, and the evaluation providing unit 325 provides the customer device with the routing destination evaluation data stored in the evaluation data storage unit 331 (step S605). This operation at step S605 is optional, and may be omitted together with the later described steps S606, S607 and S608. If this is the case, the process proceeds from step S604 to step S609.

After step S605, the communication I/F 310 awaits the reception of weights over a predetermined period of time (step S606). When the communication I/F 310 receives a weight, the process proceeds to step S607, while when the communication I/F 310 does not receive a weight, the process proceeds to step S609.

At step S607, the weight acquisition unit 326 acquires the received weight, and writes it into the weight storage unit 334. Next, the policy determination unit 324 determines a new policy based on the weights acquired at step S607 (step S608). The policy determination unit 324 may include the weights as-is in the policy, or determine, as the weight of a candidate, the proportion of the weight of the candidate to the total weights assigned to all the routing destination candidates. After step S608, the process proceeds to step S610.

At step S609, the policy determination unit 324 reads the routing destination evaluation data from the evaluation data storage unit 331, and determines the new policy based on the scores of the routing destination candidates included in this data. For instance, the policy determination unit 324 may determine, as the weight of each candidate, the proportion of the score of the candidate to the total score of all the routing destination candidates to be included in the policy. After step S609, the process proceeds to step S610.

At step S610, the policy notification unit 327 notifies the routing control apparatus 20 of the policy determined at step S608 or S609. After step S610, the communication I/F 310 awaits reception of the routing destination evaluation data (step S601), while the update condition determination unit 322 awaits the satisfaction of the policy update condition (step S603).

(3) Effects

As described above, the routing destination evaluation apparatus according to the present embodiment evaluates a plurality of candidates of routing destinations and generates routing destination evaluation data, based on the time-series data of the types of metrics associated with the candidates to which the routing control apparatus routes requests. This routing destination evaluation apparatus is therefore capable of dynamically evaluating request routing destination candidates.

Furthermore, upon receipt of a metrics providing request from an external device on the network via the communication I/F, the metrics generation apparatus transmits the request-targeted metrics data to the external device, which is the request source, via the communication I/F. In this manner, new services can be provided to external devices.

In addition, upon receipt of an evaluation providing request from an external device on the network via the communication I/F, the routing destination evaluation apparatus transmits the request-targeted routing destination evaluation data to the external device, which is the request source, via the communication I/F. In this manner, new services can be provided to external devices.

In the above embodiment, an external device that issues to the routing destination evaluation apparatus or metrics generation apparatus a request for providing routing destination evaluation data and metrics data is not specifically defined; however, a certain kind of authentication control may be conducted so that metrics data and routing destination evaluation data will be provided to specific external devices only. For such data provision, billing control referring to the amount of data provided, such as the number of edges included in the routing destination evaluation data and types of metrics included in the metrics data, may also be adopted.

In addition to the above, the configuration and processing procedure of the routing destination evaluation apparatus and the configurations of the storage units can be modified in various manners without departing from the gist of the present embodiment.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

1 Routing control system
10 Policy determination apparatus
11 Routing destination evaluation apparatus
12 Metrics generation apparatus
13 Policy control apparatus
20, 20A, 20B, 30, 30A, 30B Routing control apparatus
41 Probe server
42 Monitoring system
50, 50A, 50B End user 60 Origin server
70, 70A, 70B, 70C Edge server
80 DNS resolver
90 Authoritative DNS server
100, 100A, 100B CDN
110, 210, 310 Communication I/F
120, 220, 320 Processor
121 Metrics acquisition unit
122 Priority acquisition unit
123, 322 Update condition determination unit
124, 323 Update request unit
125 Routing destination evaluation unit
126 Evaluation providing request acquisition unit
127, 325 Evaluation providing unit
130, 230, 330 Memory
131, 232 Metrics storage unit
132, 332 Setting data storage unit
133, 331 Evaluation data storage unit
221 Monitoring data acquisition unit
222 Metrics generation unit
223 Metrics providing request acquisition unit
224 Metrics providing unit
231 Monitoring data storage unit
321 Evaluation acquisition unit
324 Policy determination unit
326 Weight acquisition unit
327 Policy notification unit
333 Policy storage unit
334 Weight storage unit

The invention claimed is:

1. A routing destination evaluation apparatus comprising:
a metrics acquisition unit configured to acquire time-series data of a plurality of types of metrics associated with a candidate, the candidate being one of candidates of a routing destination to which a routing control apparatus routes a request including first destination data, the metrics including an indicator used for evaluation of selectable candidates as a request routing destination, the indicator indicating states of the candidates;
a routing destination evaluation unit configured to evaluate the candidates based on the time-series data and a plurality of priorities, and generate routing destination evaluation data including an evaluation value for each candidate, the time-series data indicating the types of metrics associated with the candidate and states of the candidates at a time point, the priorities being assigned to the types of metrics;
an update condition determination unit configured to determine whether or not a preset evaluation update condition is satisfied, the preset evaluation update condition including changed values of at least one of the metrics or scores of the metrics; and
an update request unit configured to request an update of the routing destination evaluation data when it is determined that the evaluation update condition is satisfied,
wherein the priorities are numerical values representing what proportion is assigned to which type of the types of metrics,
a proportion, of the evaluation value of a candidate to a total evaluation value of all candidates to be included in a policy, is determined as a weight of each candidate, and
the weight of each candidate is used for a weighted round robin scheme.

2. The routing destination evaluation apparatus according to claim 1, the apparatus further comprising:
a priority acquisition unit configured to acquire priorities received from a customer device authorized to set the priorities,
wherein the routing destination evaluation unit evaluates the candidates based on the time-series data and the priorities received from the customer device, and generates the routing destination evaluation data.

3. The routing destination evaluation apparatus according to claim 1, wherein
the routing destination evaluation unit calculate evaluation values of the candidates by adding values weighted in accordance with the priorities, the values being based on the time-series data of the types of metrics corresponding to the candidate, and generates the routing destination evaluation data by ranking at least a portion of the candidates in descending order of the evaluation values.

4. The routing destination evaluation apparatus according to claim 2, wherein
the routing destination evaluation unit calculate evaluation values of the candidates by adding values weighted in accordance with the priorities, the values being based on the time-series data of the types of metrics corresponding to the candidate, and generates the routing destination evaluation data by ranking at least a portion of the candidates in descending order of the evaluation values.

5. The routing destination evaluation apparatus according to claim 4, wherein
the values based on the time-series data of the types of metrics are normalized so as to fit in a predetermined numerical range.

6. The routing destination evaluation apparatus according to claim 1, wherein
the types of metrics associated with a first candidate of the candidates include first metrics relating to a transmission cost of the request when the first candidate is selected as the routing destination, and second metrics relating to transmission quality of the request when the first candidate is selected as the routing destination.

7. The routing destination evaluation apparatus according to claim 2, wherein
the types of metrics associated with a first candidate of the candidates include first metrics relating to a transmission cost of the request when the first candidate is selected as the routing destination, and second metrics relating to transmission quality of the request when the first candidate is selected as the routing destination.

8. The routing destination evaluation apparatus according to claim 3, wherein
the types of metrics associated with a first candidate of the candidates include first metrics relating to a transmission cost of the request when the first candidate is selected as the routing destination, and second metrics relating to transmission quality of the request when the first candidate is selected as the routing destination.

9. The routing destination evaluation apparatus according to claim 1, the apparatus further comprising:
an evaluation providing unit configured to provide an external device with the routing destination evaluation data.

10. The routing destination evaluation apparatus according to claim 2, the apparatus further comprising:
an evaluation providing unit configured to provide an external device with the routing destination evaluation data.

11. The routing destination evaluation apparatus according to claim 3, the apparatus further comprising:
an evaluation providing unit configured to provide an external device with the routing destination evaluation data.

12. A routing destination evaluating method comprising:
acquiring time-series data of a plurality of types of metrics associated with a candidate, the candidate being one of candidates of a routing destination to which a routing control apparatus routes a request including first destination data, the metrics including an indicator used for evaluation of selectable candidates as a request routing destination, the indicator indicating states of the candidates; and
evaluating the candidates based on time-series data and a plurality of priorities, and generating routing destination evaluation data including an evaluation value for each candidate, the time-series data indicating the types of metrics associated with the candidate and states of the candidates at a time point, the priorities being assigned to the types of metrics;
determining whether or not a preset evaluation update condition is satisfied, the preset evaluation update condition including changed values of at least one of the metrics or scores of the metrics; and
requesting an update of the routing destination evaluation data when it is determined that the evaluation update condition is satisfied,
wherein the priorities are numerical values representing what proportion is assigned to which type of the types of metrics,
a proportion, of the evaluation value of a candidate to a total evaluation value of all candidates to be included in a policy, is determined as a weight of each candidate, and
the weight of each candidate is used for a weighted round robin scheme.

13. A non-transitory computer readable medium storing a computer program which is executed by a computer to provide the steps of:
acquiring time-series data of a plurality of types of metrics associated with a candidate, the candidate being one of candidates of a routing destination to which a routing control apparatus routes a request including first destination data, the metrics including an indicator used for evaluation of selectable candidates as a request routing destination, the indicator indicating states of the candidates; and
evaluating the candidates based on time-series data and a plurality of priorities, and generating routing destination evaluation data including an evaluation value for each candidate, the time-series data indicating the types of metrics associated with the candidate and states of the candidates at a time point, the priorities being assigned to the types of metrics;
determining whether or not a preset evaluation update condition is satisfied, the preset evaluation update condition including changed values of at least one of the metrics or scores of the metrics; and
requesting an update of the routing destination evaluation data when it is determined that the evaluation update condition is satisfied,
wherein the priorities are numerical values representing what proportion is assigned to which type of the types of metrics,
a proportion, of the evaluation value of a candidate to a total evaluation value of all candidates to be included in a policy, is determined as a weight of each candidate, and
the weight of each candidate is used for a weighted round robin scheme.

* * * * *